Aug. 10, 1954

D. B. PARLIN 2,685,894

MANUFACTURE OF SINGLE AND MULTIFRAME JACQUARD WOVEN CARPETS

Filed Dec. 28, 1952

David B. Parlin
Inventor
by
Attorney

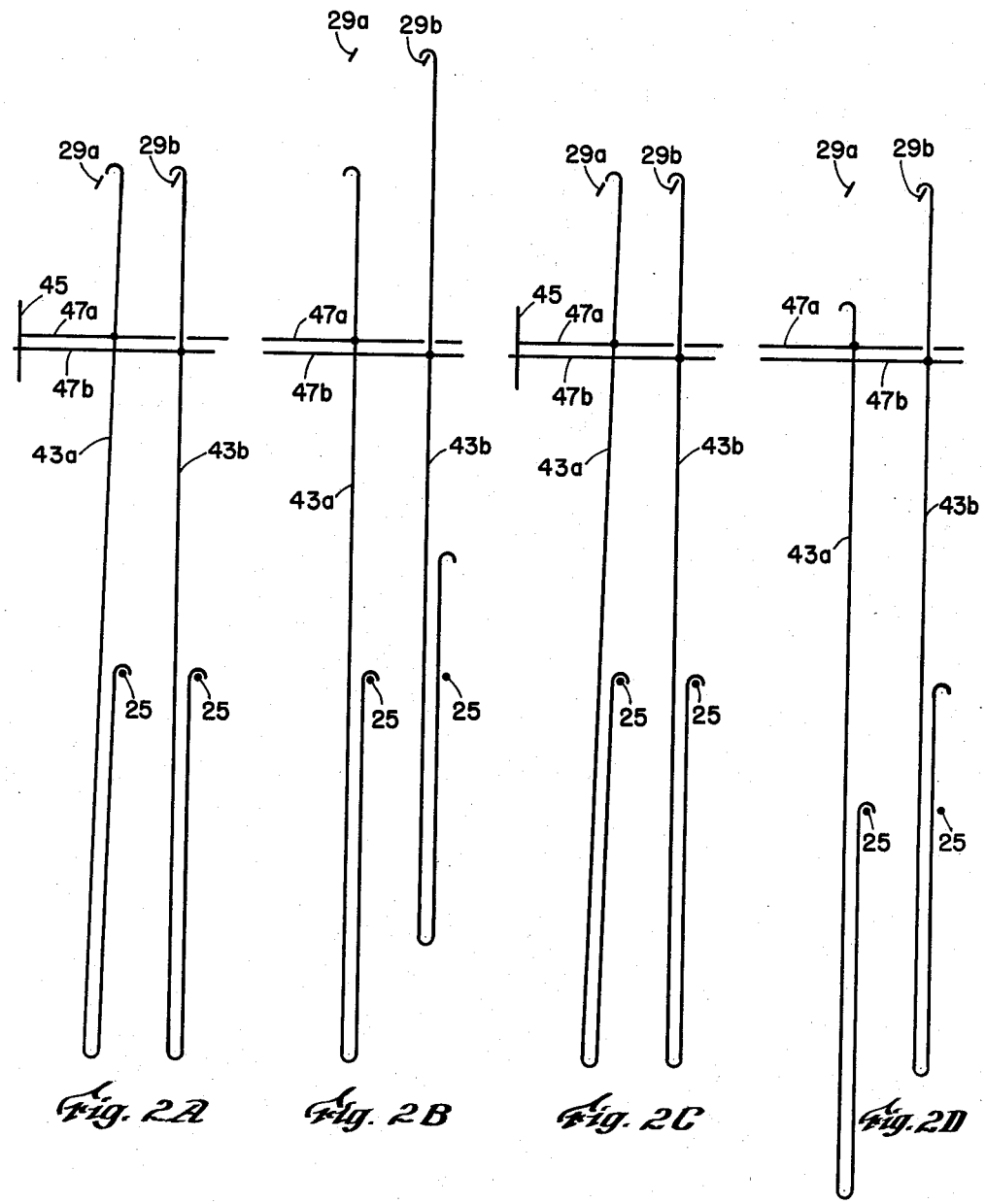

David B. Parlin

David B. Parlin
Inventor
by
Attorney

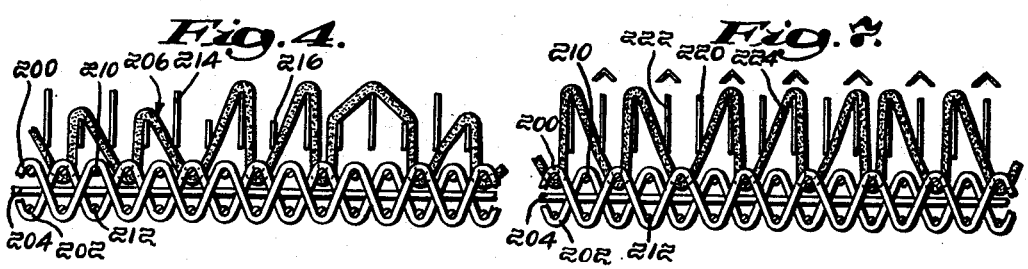
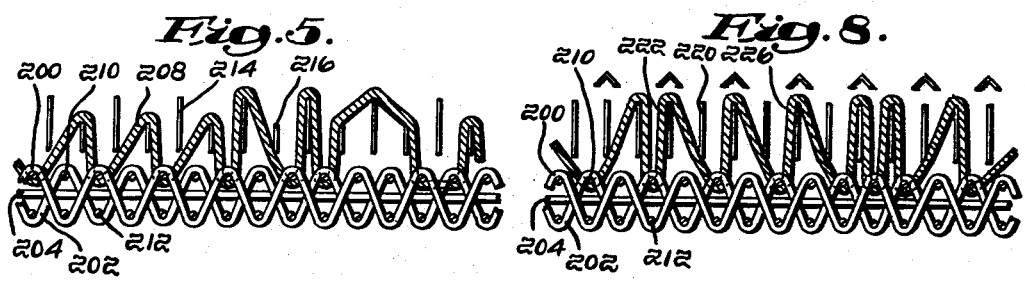
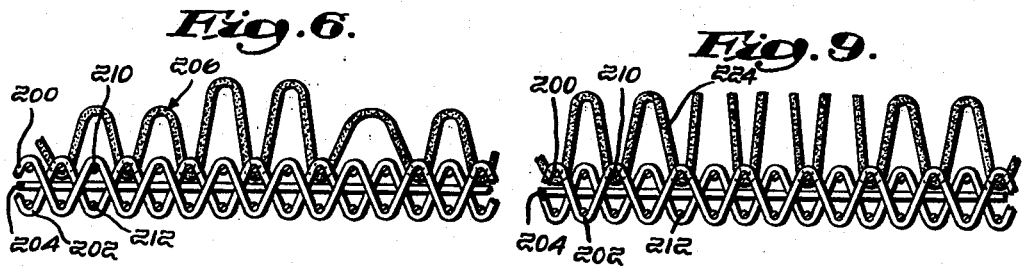
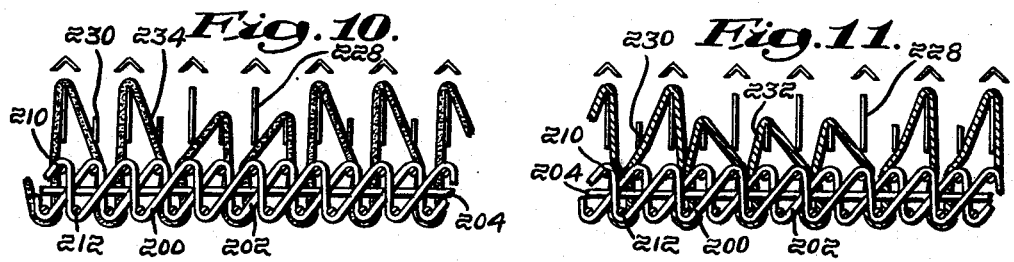
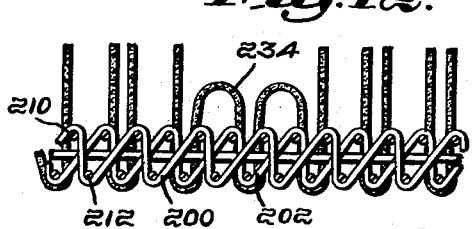

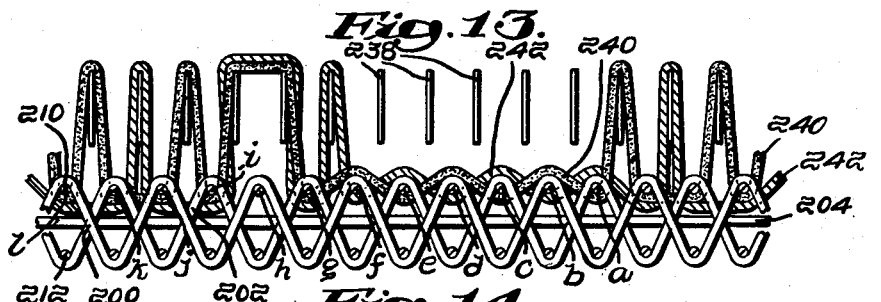
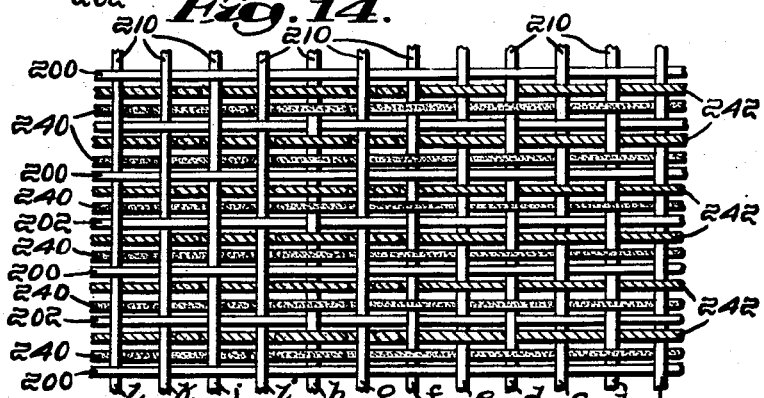
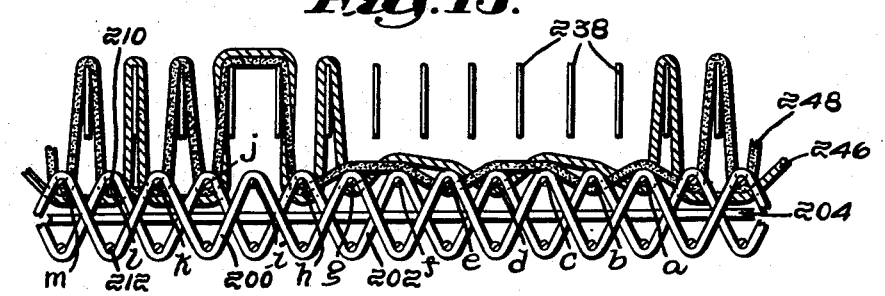
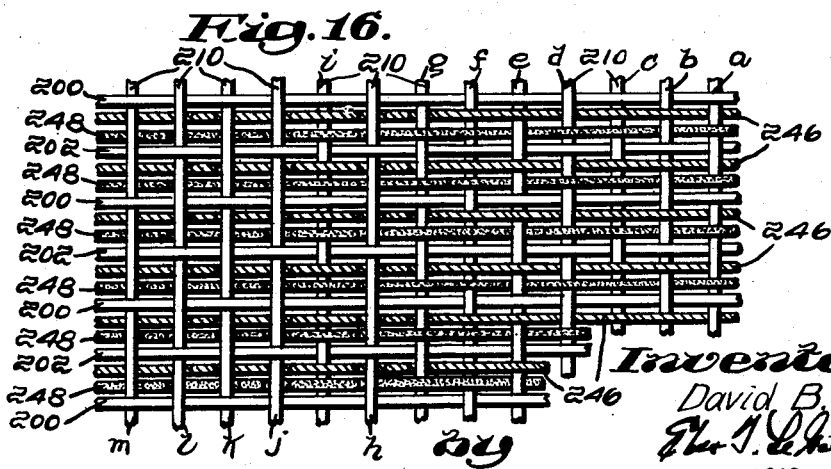

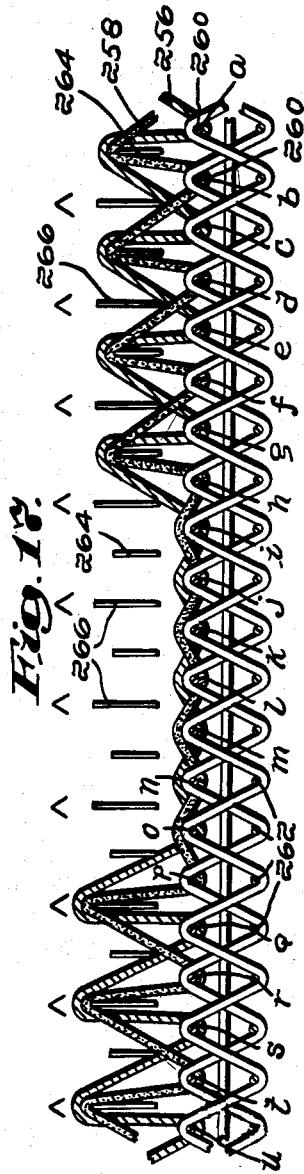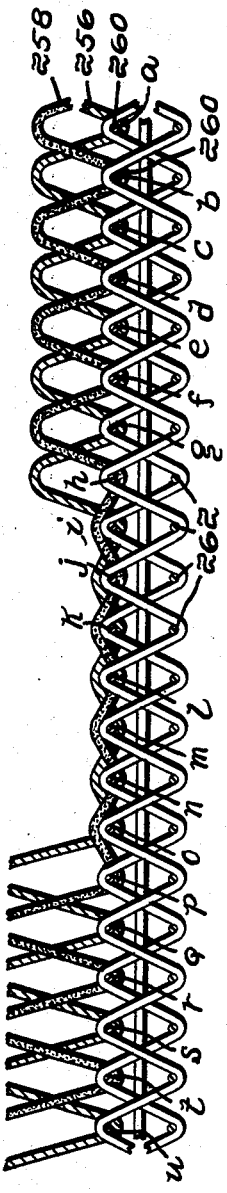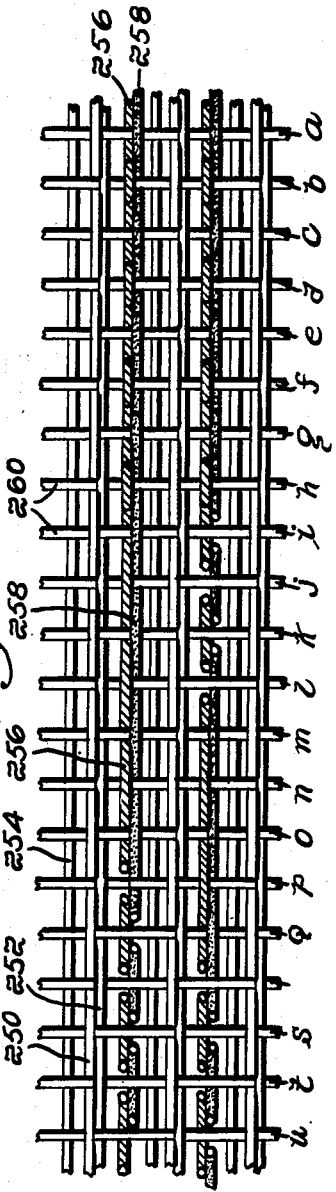

Patented Aug. 10, 1954

2,685,894

UNITED STATES PATENT OFFICE 2,685,894

MANUFACTURE OF SINGLE AND MULTI-FRAME JACQUARD WOVEN CARPETS

David B. Parlin, Thompsonville, Conn., assignor to Bigelow-Sanford Carpet Company, Inc., Thompsonville, Conn., a corporation of Delaware Application November 28, 1952, Serial No. 322,997

48 Claims. (Cl. 139—39)

The present invention relates to improvements in the manufacture of single and multi-frame jacquard woven carpets, and more particularly to the manufacture of a two-shot weave carpet of the general type having chain warps, stuffer warps, pile warps and upper and lower weft shots inserted alternately and in opposite directions. The pile warps are raised over pile wires which are inserted through the shed with each weaving cycle to form a raised pile surface of varying characteristics depending upon the type of pile wire employed.

The weave of the pile yarns may take the conventional form in which the pile warps are normally tied-in under each successive upper weft shot and are raised over pile wires inserted through the shed simultaneously with each lower weft shot in the reverse direction, or may take the form of a through-to-the back pile surface weave in which the pile warps are tied-in under the lower weft shots and are raised over pile wires inserted through the shed at the same time with the upper weft shots.

The present invention is an improvement upon a conventional jacquard carpet weave in which the hooks carrying the lingoes through the eyes of which the pile yarn warps pass are indexed by a card mounted on the index cylinder. The card has holes punched through it in accordance with the pattern of the pile surface of the carpet. Each hook is engaged by a needle one end of which is pressed by a spring on its other end either against a blank space on the card or through one of the holes in the card. Those needles which press against a blank space of the card are moved by the beating action of the cylinder and cause the upper portion of the respective hooks to move out of vertical alignment with the knives on the upper shelf of the jacquard. Those needles which pass through holes in the card are not moved by the action of the cylinder, and therefore their respective hooks are not moved out of vertical alignment with their respective knives on the upper shelf of the jacquard. These latter hooks are "selected."

In the weaving of a conventional two-shot fabric, during the indexing operation while the sheds are in their lowermost position, an upper weft shot is passed through the shed below one series or plane of chain warps but over all the other warp elements including pile yarn warps.

Immediately after the maximum index of the index cylinder, the upper and lower shelves are raised, the former rising approximately twice as fast and as far as the latter. The upper shelf carries upwardly only the selected hooks. The lower shelf carries only the unselected hooks. Consequently, when the upper and lower shelves reach their uppermost positions, the selected hooks have raised their respective pile yarn warps to a height approximately twice as high as the unselected hooks have raised their respective pile yarn warps.

While the shelves are rising the reed beats up the upper weft shot into the fell of the carpet accompanied by an interchange of chain warps thereby weaving all the pile yarns under said upper weft shot.

While the shelves are in and near their uppermost positions, a pile wire is inserted below the selected pile yarn warps and over all the other warp elements, and a lower weft shot is inserted over said series of chain warps and below all the other warp elements. After the insertion of the pile wire and the lower weft shot the shelves are lowered back to their former, lowermost position to repeat the cycle, and the reed beats up the pile wire and the lower weft shot into the fell of the carpet.

It is a principal object of the invention to provide a novel and improved method of weaving two-shot weave carpets which is well adapted to produce a wide range and variety of pile surface weaves not available with carpet looms of the prior art.

More specifically it is an object of the invention to provide an improved method of weaving two-shot weave carpets on a carpet loom having a jacquard mechanism and pile wires for producing raised pile loops, which is well adapted for the production of floated pile loops including over- and under-the-wire floats of the pile warps in the construction of the carpet pile surface.

Other objects of the invention relate to the development of a number of novel and improved carpet pile surface weaves and effects which may be produced in accordance with the method and with the apparatus hereinafter described.

With these and other objects as may hereinafter appear the several features of the invention consist in the method and in the fabric weaves and combinations hereinafter described and claimed which together with the advantages to be obtained thereby will be readily understood from the following description taken in connection with the drawings in which:

Figs. 2A, 2B, 2C and 2D are progressive diagrammatical views showing how the shelves, hooks and needles operate;

Figs. 4, 5 and 6 are diagrammatic views of a high and low pile loop carpet;

Figure 1:
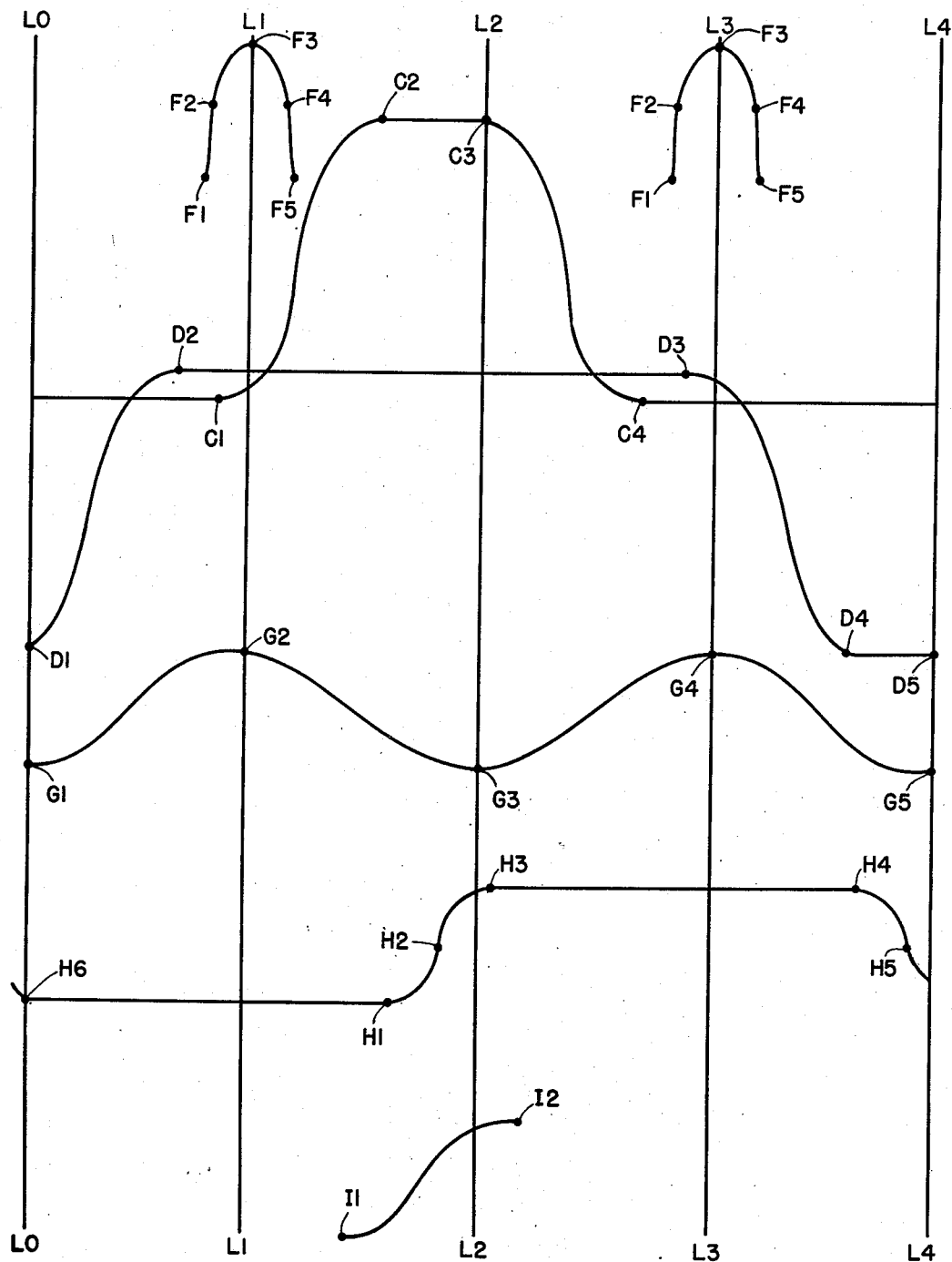
Fig. 1 is a (time) chart graphically illustrating substantially the various motions of some of the elements of the loom and of the shelves and index cylinder in the process of this invention.

Fig. 4 being a diagrammatic view showing one form of a high-low floated pile loop weave showing the path taken by one selected group of pile warps;

Fig. 5 is a view similar to Fig. 4 but showing the alternate path taken by a second selected group of pile warps;

Fig. 6 is a view similar to Fig. 4 but with the pile wires withdrawn;

Figs. 7, 8 and 9 are a series of views illustrating a so-called cut and uncut pile loop fabric weave;

Fig. 7 illustrating in diagrammatic form the path taken by one group of pile warps;

Fig. 8 being a view similar to Fig. 7 but illustrating the different path taken by other selected pile warps;

Fig. 9 being a view similar to Fig. 7 but with all the pile wires withdrawn;

Figs. 10, 11 and 12 are a series of views illustrating a through-to-the back cut and uncut pile surface weave;

Fig. 10 showing the path taken by one of the pile warps forming succeeding cut and uncut areas;

Fig. 11 being a view similar to Fig. 10 but showing the portions of the pile warp offset from the pile wire over which it was raised to the right;

Fig. 12 being a view similar to Fig. 10 but with the pile wires withdrawn;

Figs. 13 and 14 illustrate one form of a fabric employing heavy lash, including raised pile loop areas, and fabric ground areas, of which the pile warps forming the fabric ground are floated over alternate upper weft shots, but beneath the associated pile wires;

Fig. 14 is a diagrammatic plan view of the fabric weave shown in Fig. 13.

Figs. 15 and 16 are diagrammatic views of a fabric employing heavy lash somewhat similar to Figs. 13 and 14, but with the ground fabric pile yarn floated over two instead of one intervening upper weft shot; and Figs. 17, 18 and 19 are diagrammatic views of a two-frame pile surface weave illustrating the use of over and under wire floats to produce selectively ground pile, loop pile, and cut pile areas in the fabric;

Fig. 17 being a diagrammatic view showing the paths taken by the two pile warps, stuffer warp and chain warps passing through one dent of the reed;

Fig. 18 being a view similar to Fig. 17 but with the pile wires withdrawn; and

Fig. 19 being a diagrammatic plan view of the fabric weave including portions of the warps confined within two adjacent dents of the reed including the dent specifically illustrated in Figs. 17 and 18.

The mechanical elements of a loom on which this invention may be practiced differ from those of the conventional Jacquard loom in the following respects; whereas the linkages of the conventional loom between the lower loom shaft and the upper and lower shelves of the jacquard are usually both operated by a single cam mounted on said shaft and are also jointed to each other by a common link, the linkages of the loom employed in practicing the invention between the lower loom shaft and the upper and lower shelves of the jacquard are each operated by its own respective cam mounted on said shaft and are not joined together by a common link, whereby each linkage and therefore each shelf may be operated independently of the other. And also, whereas the linkage to the index cylinder of the conventional loom usually extends from and is operated by the lower loom shaft, the linkage of the index cylinder of the loom employed in practicing this invention extends from and is operated by the lay crank shaft, whereby the index cylinder is beaten up twice instead of once during a complete cycle of the lower loom shaft.

Referring to the drawings, the relative motions according to my invention of the upper and lower shelves, the index cylinder, the reed, the upper and lower weft shots and the pile wires will be described with reference to Fig. 1 in respect to space (the ordinates thereof) and time (the abscissas thereof). The motions of the reed, weft shots and pile wire are conventional.

$C1$ is the point at which the upper shelf in its lowermost position starts upward, $C2$ the point at which said shelf reaches its uppermost position, $C3$ the point at which said shelf in its uppermost position starts downward, and $C4$ the point at which said shelf returns to its lowermost position.

$D1$ is the point at which the lower shelf in its lowermost position starts upward, $D2$ the point at which said shelf reaches its uppermost position, $D3$ the point at which said shelf in its uppermost position starts downward, $D4$ the point at which said shelf returns to its lowermost position, and $D5$ the point at which said shelf in its lowermost position starts upward again.

$F1$, $F2$, $F3$, $F4$ and $F5$ are, respectively, the points at which the index cylinder starts its index motion, reaches minimum effective index, reaches maximum index, returns through its minimum effective index and ends its index motion.

$G1$, $G3$, and $G5$ are the points at which the reed is in its most retracted position away from the fell and $G2$ and $G4$ are the points at which the reed is beaten up in its position nearest the fell.

$H1$ is the point at which the right hammer of the shuttle carrying the lower weft shots starts, $H2$ the point at which the right hammer lets go, $H3$ the approximate point at which the travel of the shuttle is stopped, $H4$ the point at which the left hammer of the shuttle carrying the upper weft shot starts, $H5$ the point at which the left hammer lets go, and $H6$ the approximate point at which the motion of the shuttle is stopped.

$I1$ and $I2$ are, respectively, the approximate points at which the point of the pile wire enters the shed on one side and passes beyond the shed on the other side thereof.

The vertical line $L1$ on which the points $F3$ and $G2$ lie represents the point at which the lower loom shaft has rotated ninety degrees from its position represented by the vertical line $L0$ on which the points $D1$ and $G1$ lie. Likewise, the vertical line $L2$ on which the points $C3$ and $G3$ lie represents a rotation of 180° of said shaft; the vertical line $L3$ on which $F3$ and $G4$ lie represents a rotation of 270° of said shaft, and the vertical line $L4$ on which the points $D5$ and $G5$ lie represents a rotation of 360° of said shaft.

In Figs. 2A, 2B, 2C and 2D the action of the hooks and needles of the jacquard according to this invention by means of the motions of the upper and lower shelves and the index-cylinder is progressively illustrated.

In Fig. 2A, hooks 43a and 43b are being indexed by the index-cylinder card 45 by means of the needles 47a and 47b. As shown the needle 47a has been pushed to the right by a blank in the card 45, thereby carrying the hooks 43a to the right and into a position in which its upper end is moved out of vertical alignment with the knife 29a of the upper shelf. The needle 47b on the other hand, has not been moved because its left hand end passes through a hole in the card 45. Consequently, the hook 43b is unmoved, and therefore, its upper end remains in vertical alignment over the knife 29b of the upper shelf. As far as the upper and lower shelves and the index card are concerned, their positions just described correspond to their relative positions shown on the vertical line L1 of Fig. 1.

In Fig. 2B, the upper shelf carrying therewith the knives 29a and 29b and the hook 43b hanging on the knife 29b, has been raised to its uppermost position. The lower shelf 25 has remained stationary supporting the hook 43a. The index card during the raising of the upper shelf has been retracted allowing the needle 47a to return to its normal spring-pressed position. Needle 47b has remained stationary. These positions of the upper and lower shelves correspond to their relative positions shown on the vertical line L2 of Fig. 1.

In Fig. 2C the shelves have returned to the same positions as shown in Fig. 2A, and the needles and hooks have been indexed by the card in the same manner as described in reference to Fig. 2A. These positions of the shelves and card correspond to those depicted on the vertical line L3 of Fig. 1.

In Fig. 2D, the lower shelf 25 has been lowered to its lowermost position and the upper shelf with its knives 29a and 29b has remained stationary. The hook 43a, because of its erstwhile vertical displacement in relation to the knife 29a, has been lowered with the lower end thereof resting on the lower shelf 25. The hook 43b has dropped only very slightly onto the knife 29b. The needle 47a, because of the retraction of the index card while the lower shelf was lowered, has returned to its conventional spring-pressed position. The needle 47b has remained stationary throughout. These positions of the shelves correspond to those shown on vertical line L4 of Fig. 1.

From Fig. 2D, the elements depicted return to their positions as shown in Fig. 2A.

In the following description of Figs. 3A through 3I, the box Q is employed to designate symbolically a creel or a beam for various warp elements. In said figures, the pile yarn warps each extend preferably from a creel, and the stuffer and chain warps each extend preferably from a beam.

Figure 3A:
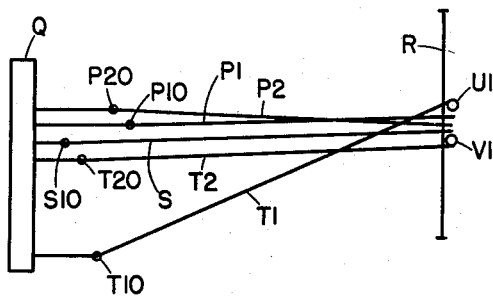
Figs. 3A through 3I are progressive diagrammatical views of the operation of the lingo and heddle eyes, reed, weft shots, warp elements and pile wires.

In Fig. 3A the reed R has just beaten up upper weft shot U1 into the fell of the carpet. The lower weft shot V1 was beaten up by the reed in a previous operation. From the fell, from a position between the weft shots U1 and V1, pile yarn warp P1 extends back through lingo eye P10 to creel Q, pile yarn warp P2 extends back through lingo eye P20 to creel Q, and stuffer warp S extends back through heddle eye S10 to beam Q. Chain warp T1 extends from a position over the weft shot U1 back through heddle eye T10 to beam Q and chain warp T2 extends from a position under the weft shot V1 back through heddle eye T20 to beam Q. The hooks 43a and 43b, Fig. 2A, to which the lingo eyes P20 and P10 are respectively attached by tail cords (not shown), are being indexed. The positions of the lingo eyes and the reed correspond to those of the shelves and the reed on line L1, Fig. 1.

Figure 3B:
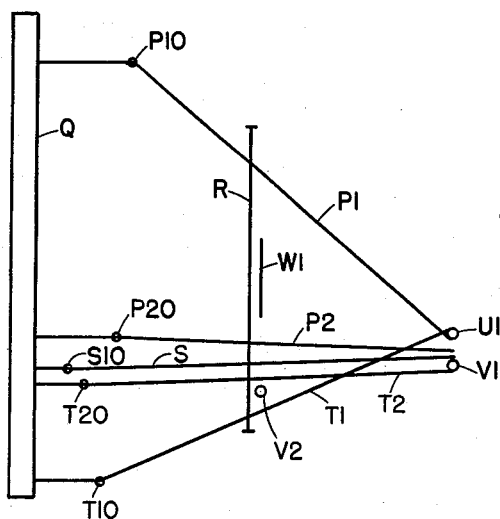

In Fig. 3B the eyes P10 attached to the hook 43b, Fig. 2B, has reached its uppermost position, and the eye P20 attached to the hook 43a, Fig. 2B, has remained stationary. The reed R has been carried back, wire W1 is inserted in the front of the reed R, under the pile yarn warp P1 and over the pile yarn warp P2, stuffer warp S and chain warps T1 and T2, and lower weft shot V2 is inserted in front of the feed R, over the chain warp T1 and under the chain warp T2, stuffer warp S and pile yarn warps P1 and P2. The positions of the lingoes, reed, wire W1 and weft shot V2 correspond to those of the shelves, reed, wire and shuttle on line L2, Fig. 1.

Figure 3C:
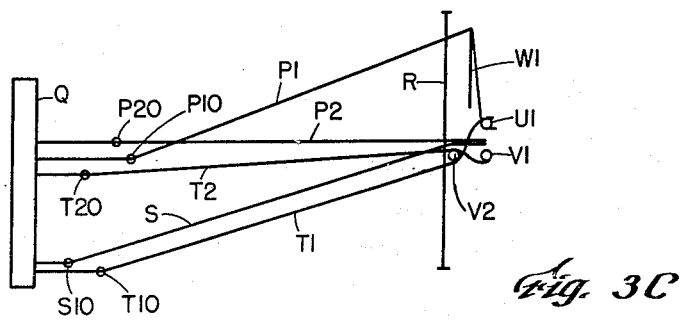

In Fig. 3C the reed has beaten up the wire W1 and lower weft shot V2. The eye P10 attached to the hook 43b, Fig. 2C, has been lowered. The eye P20 attached to the hook 43a, Fig. 2C, has remained stationary. In this position of the eyes P10 and P20, the hooks 43a and 43b, Fig. 3C, are indexed. The positions of the lingoes and the reed correspond to those of the shelves and reed on line L3, Fig. 1.

Figure 3D:
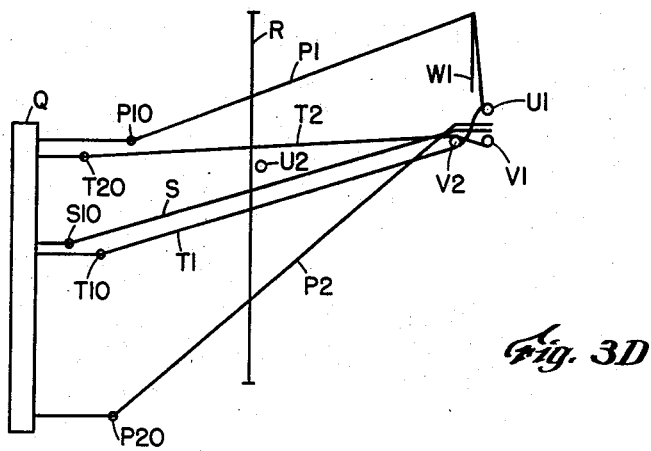

In Fig. 3D, the eye P10 attached to the hook 43b, Fig. 2D, remains stationary, the eye P20 attached to the hook 43a, Fig. 2D, has descended to its lowermost position. The reed R has been carried back and upper weft shot U2 has been inserted in front of the reed, and not only under the chain warp T2 but also under the pile warp P1 and over the stuffer warp S, chain warp T1 and the pile warp P2. The positions of the lingoes, reed and weft shot U2 correspond to those of the shelves, reed and shuttle on line L4 or line L0 of Fig. 1.

Figure 3E:
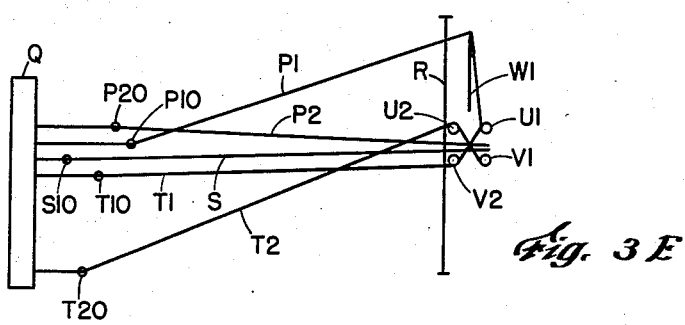

In Fig. 3E, the upper weft shot U2 when it is beaten up by the reed R, is not over but under the pile yarn P1 which therefore is not woven into the fell of the carpet but floats over the upper weft shot U2. The rest of the elements with the exception of the vertical interchange of the chain warps T1 and T2 and their heddles T10 and T20, are positioned and function like those of Fig. 3A.

Figure 3F:
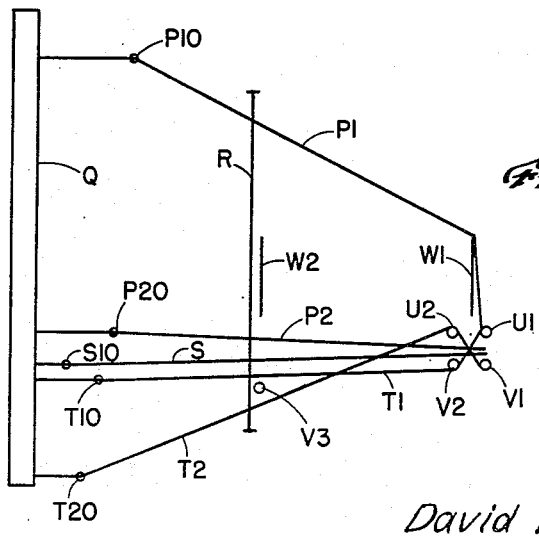
Figure 3G:
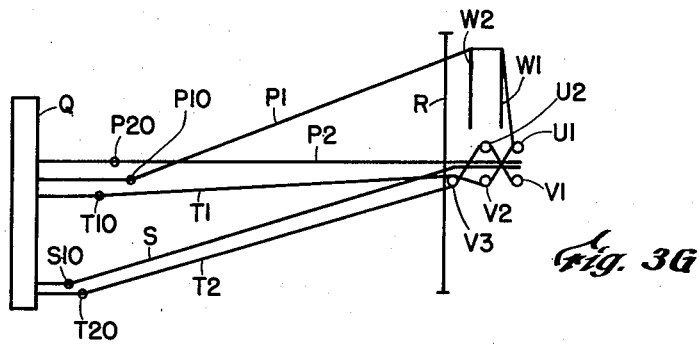

In Fig. 3F another wire W2 and another lower weft shot V3 are inserted as were the wire W1 and weft shot V2 in Fig. 3B, and in Fig. 3G are beaten up as were the wire W1 and weft shot V2 in Fig. 3C. The rest of the elements involved are positioned and function as hereinbefore described.

Figure 3H:
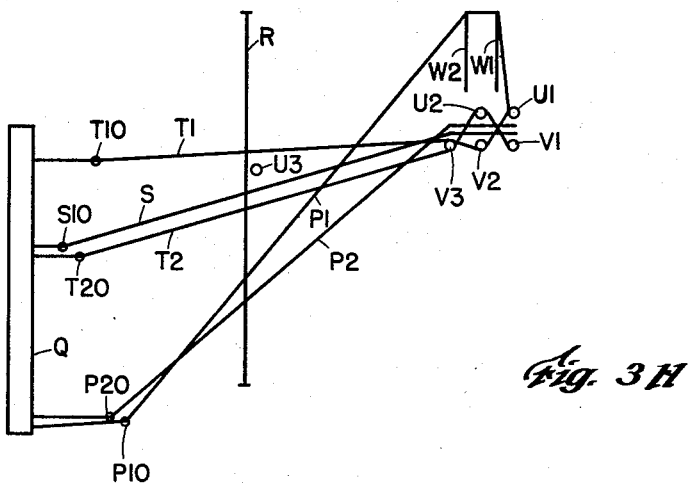
Figure 3I:
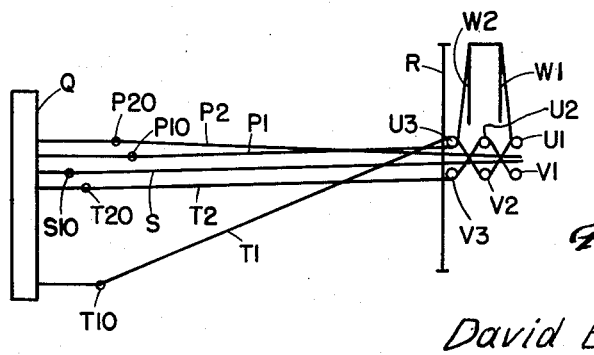

In Fig. 3H another upper weft shot U3 is inserted before the reed R. As a matter of choice this time the hook 43b, Figs. 2C and 2D, supporting by means of its tail cord (not shown) the eye P10, has been moved to one side of the knife 29b in the same manner as the hook 43a was moved to one side of the knife 29a, Fig. 2C. Therefore, the eye P10 descends in the same manner and to the same position vertically as the eye P20. As a result the pile warp P1 passes under the upper weft shot U3 and not over it in contrast to its position over the other weft shot U2 in Fig. 3D, and as a further result, as illustrated in Fig. 3I the pile warp P1 is woven into the fell of the carpet under the shot U3.

An important feature of the novel method of weaving a two-shot pile carpet above described consists in the steps of forming a separate index and of raising a separate pile yarn shed for the insertion of each individual upper and lower weft shot. This procedure has the effect of greatly expanding the variety and type of pile surface weaves available for the production of a carpet of this general type. In accordance with the invention each individual pile warp may as a matter of choice be tied-in beneath or floated over each successive upper weft shot where a conventional weave construction is employed or under or over a lower weft shot where a through-to-the-back weave construction is employed and thereafter as a result of a second selection of warps may be passed over or under each succeeding pile wire in accordance with the dictation of the jacquard mechanism.

Also, I can reproduce exactly the same design of pile surface on the carpet as in conventional jacquard weaving by placing over the cylinder face a blank card with no holes in it for the indexing operation occurring just previous to the lowering of the lower shelf.

Inasmuch as the process of this invention is more versatile than the conventional jacquard processes, many designs can be made by using not only ordinary, single-height pile wires, but also by using wires having various heights along their lengths and those having knives. In addition, the use of a multi-frame jacquard would carry the possibilities and combinations up to astronomically high figures, particularly if "heavy lash" is employed. The phrase "heavy lash," as hereinafter more fully described, denotes the condition wherein two separately activated pile yarn warps pass through the same dent in the reed, and are jointly or selectively actuated at either index point in the weaving cycle.

The method above described has the advantage that less power is expended to operate the shelves, but many variations concerning the positions of the shelves during indices and the relatives motions and relative positions of the shelves between indices may be employed to obtain the same result namely the ability of floating selected pile yarn warps over as many successive weft shots and pile wires as desired. Some of said variations, including the aforesaid preferred method, are enumerated below.

(I) The upper shelf is in its lowermost position and the lower shelf is in its uppermost position for both indices. Between the first and second indices, the upper shelf moves up and then down, while the lower shelf either (1) remains stationary or (2) moves down and then up; and between the second and third indices (the first and third indices are identical) the upper shelf remains stationary, while the lower shelf moves down and then up.

In (I) above and in the following variations an index takes place when the upper and lower shelves are nearest together, e. g. their positions on lines L1 and L3 of Fig. 1.

(II) The upper and lower shelves are in their uppermost positions for both indices. Between the first and second indices the upper shelf remains stationary while the lower shelf either (1) moves down to mid-position (a position substantially halfway between uppermost and lowermost positions) and then up or (2) moves down to its lowermost position and then up; and between the second and third indices the upper shelf remains stationary, while the lower shelf moves down to its lowermost position and then up.

(III) The upper and lower shelves are in their lowermost positions for both indices. Between the first and second indices the upper shelf moves up to its uppermost position and then down, while the lower shelf either (1) moves up to mid-position and then down or (2) remains stationary; and between the second and third indices the upper shelf moves up to mid-position and then down, while the lower shelf remains stationary.

(IV) The upper and lower shelves are in their lowermost positions for the first index; and the upper shelf is in mid-position and the lower shelf is in its uppermost position for the second index. Between the first and second indices the upper shelf moves up to its uppermost position and then down, while the lower shelf either (1) moves up and then remains stationary or (2) remains stationary and then moves up; and between the second and third indices the upper shelf remains stationary and then moves down, while the lower shelf moves down and then remains stationary.

In (IV) above and in the following variations between successive indices wherein a shelf remains stationary and then moves up (or down) or vice versa, said shelf remains stationary for substantially half the time between said indices and moves up (or down) for the other half.

(V) The upper shelf is in mid-position and the lower shelf is in its uppermost position for the first index; and the upper and lower shelves are in their lowermost positions for the second index. Between the first and second indices the upper shelf moves up to its uppermost position and then down, while the lower shelf either (1) remains stationary and then moves down or (2) moves down and then remains stationary, and between the second and third indices the upper shelf moves up to mid-position and then remains stationary, while the lower shelf remains stationary and then moves up.

(VI) The upper and lower shelves are in their uppermost positions for the first index; and the upper shelf is in its lowermost position and the lower shelf is in mid-position for the second index. Between the first and second indices the upper shelf remains stationary and then moves down, while the lower shelf either (1) moves down and then remains stationary or (2) moves down to its lowermost position and then moves up; and between the second and third indices the upper shelf remains stationary and then moves up, while the lower shelf moves down to its lowermost position and then up.

(VII) The upper shelf is in its lowermost position and the lower shelf is in mid-position for the first index; and the upper and lower shelves are in their uppermost positions for the second index. Between the first and second indices the upper shelf moves up and then remains stationary, while the lower shelf either (1) remains stationary and then moves up or (2) moves down to its lowermost position and then moves up; and between the second and third indices the upper shelf remains stationary and then moves down, while the lower shelf moves down to its lowermost position and then up.

(VIII) The upper and lower shelves are in their uppermost positions for the first index; and are in their lowermost positions for the second index. Between the first and second indices the upper shelf remains stationary and then moves down past mid-position, while the lower shelf either (1) moves down past mid-position or (2) moves down past mid-position and then remains stationary; and between the second and third indices the upper shelf moves up past mid-position and then remains stationary, while the lower shelf remains stationary and then moves up past mid-position.

(IX) The upper and lower shelves are in their lowermost positions for the first index; and are in their uppermost positions for the second index. Between the first and second indices the upper shelf moves up past mid-position and then remains stationary, while the lower shelf either (1) moves up past mid-position or (2) remains stationary and then moves up past mid-position; and between the second and third indices the upper shelf remains stationary and then moves down past mid-position, while the lower shelf moves down past mid-position and then remains stationary.

In each of the above variations (I) through (IX) there are two alternatives for the motion of the lower shelf between the first and second indices, namely (1) and (2). In the alternatives marked (1) a weft shot is thrown under all the pile yarn warps carried by both the upper and lower shelves. In the alternatives marked (2) said weft shot is thrown under the pile yarn warps carried by the upper shelf and above the pile yarn warps carried by the lower shelf.

Between the second and third indices a successive weft shot is thrown always under the pile yarn warps carried by the upper shelf and above the pile yarn warps carried by the lower shelf. The weft shot thrown between the first and second indices may be a lower weft shot whereas the weft shot thrown between the second and third indices is an upper weft shot; or the weft shot thrown between the first and second indices may be an upper weft shot whereas the weft shot thrown between the second and third indices is a lower weft shot.

Another set of nine variations may be produced by employing what has been referred to as an automatic index, that is, an index where no card is used on the index cylinder. For purposes of illustration, this automatic index occurs during the first index and the following variations are termed I-A through IX-A to correspond with the foregoing variations I through IX, respectively. When such an index is employed all the needles react in the same manner as the needle 47b, Fig. 2A, and all the hooks are engaged by the upper shelf as in the case of the needle 43b, Fig. 2B.

The motion of the shelves in variations I-A, V-A through IX-A is the same as that of the shelves in alternate (1) of the variations I, V through IX, respectively. The motion of the shelves in variations III-A and IV-A is the same as that of the shelves in alternate (2) of the variations III and IV, respectively. The motion of the shelves in variations II-A is the same as that of alternate (1) of variation II, except that between the first and second indices the lower shelf remains stationary in variation II-A whereas in alternate (I) of variation II between the first and second indices the lower shelf moves down to mid-position and then up.

Thus by means of the alternatives (1) and (2), the automatic index and the choice of whether a lower weft shot or an upper weft shot is first thrown between the first and second indices, the variations given above may be increased to fifty-four, which figure could be expanded practically ad infinitum if the shelf motions were allowed to include some waste motion.

In all the above variations, as in the preferred method, the pile wire is inserted between the first and second indices.

The novel arrangement of the pile warp jacquard for a carpet loom and method of operating the same, above described, makes possible the manufacture of an almost infinite variety of novel pile surface weaves in a carpet of the general type having a fabric background including for each weaving cycle an upper and a lower weft shot, stuffer warps and chain warps. Elements of my novel weaving method include the steps of making a selection of pile warps, forming a shed for the insertion of the lower weft shot, and collapsing the shed so formed, making a second selection of pile warps, and forming a second shed for the insertion of the upper weft shot.

The method of weaving which forms the subject matter of the present invention is an improvement upon and is capable of a substantially wider range of use than jacquard constructions and methods of operating the same known in the art. The present illustrated construction in which individual sheds are formed for the insertion of each alternate upper and lower weft shot is distinguished for example, from jacquard constructions and methods employed for the weaving of so-called semi-oriental rugs which are normally three-shot weaves with dead beats or missed shots employed where necessary to produce the desired pattern or figure on the underside of the fabric.

An important feature of the present invention consists in the free use of floats in connection with the weaving of the pile warps into the fabric, by means of which it has been found possible to produce a large number of novel and useful pile surface weaves in a two-shot weave carpet of single or multiple frame construction. The over-wire floats impart a noticeable increase in height in those pile loops which is desirable and which, in turn, create a pattern effect in the resulting product.

When a pile fabric of this general description is produced by the usual method of raising and collapsing only one shed for the insertion of both the lower and upper weft shots those pile warps which are to appear in the pile surface of the fabric are normally fastened in under each successive weft shot inserted in one direction through the shed, and are passed over the weft shots inserted in the reverse direction and over the pile wires inserted simultaneously therewith. In the manufacture of conventional weave fabrics the pile warps are tied-in beneath each upper weft shot and are raised over the lower weft shots and associated wires inserted therewith in order to form the pile loops or tufts as desired in the face of the fabric. In the manufacture of through-the-back woven fabrics the pile warps are tied-in beneath each successive lower weft shot and are raised over the upper weft shots and associated wires which for this type of weave are inserted simultaneously with the upper weft shots in order to form the pile loops or tufts.

In carrying out the invention a novel use is made of floats which may be produced by floating pile warps over one or more of the weft shots which would normally be employed to tie in the pile warps, and over the adjacent pile wires at each side thereof. In a preferred form of the invention shown, the successive sheds are constructed and arranged to cause the row of floated loops considered weftwise of the fabric to be staggered or offset along its length. This offset arrangement of the floated loops is effected by causing the loops raised from selected pile warps to be floated over one group of pile wires, whereas other selected pile warps are floated over a preferably overlapping but different selected group of pile wires, the pile warps of the two selected groups then being tied-in under different weft shots.

Further in accordance with the invention the several pile warps may be selectively floated under or over each successively inserted pile wire to produce a substantially increased number of fabric pile surface weaves not heretofore available to the art. In one form of the invention the pile warps being woven into any given area of the carpet are floated under all of the pile wires, and at the same time are alternately tied-in and floated selectively over one or more of the adjacent weft shots inserted in the same direction which would normally be employed to tie-in the pile warps to produce a fabric ground in which the pile warps are woven tightly over and under succeeding weft shots.

In other forms of the invention an underwire float is used in combination with alternating pile wires of different types to produce pile carpet having high and low pile surface areas, cut and uncut pile surface areas and the like. In the weaving of a pile carpet having high and low pile surface areas, for example, the pile warps will be selectively passed over one or the other of alternating high and low round wires, and will in each instance be floated beneath at least one adjacent wire. Similarly the cut and uncut pile surface areas are produced by the use of alternating round wires and cutting wires. To form a cut pile surface area the pile warps are raised over the cutting wires and are floated over two adjacent weft shots inserted in opposite directions but under the associated round pile wire. Alternately, for the weaving of the uncut pile surface area, the pile warps will be raised over the round wires and floated over two adjacent weft shots inserted in opposite directions but beneath the associated cutting wire.

Further in accordance with the invention it is proposed that the over and under wire floats above described may be employed in combination with heavy lash which may be described as joint activity of two or more separately controlled pile warps guided in a single dent of the reed. Where heavy lash is employed the pile warps are strung up in two or more frames and a pile warp from one frame is paired with a pile warp from the other frame in each dent of the reed across the width of the fabric. During the weaving operation it is contemplated that the two warps of each pair will be shedded in a different manner to insure the maintenance of a continuously parallel positional relation between the warps of each pair. It is contemplated further that the relative positions of the paired yarns from the two frames and the pattern of the shedding will be repeated across the width of the fabric to maintain a desired continuity of texture and design.

Referring to the drawings, Figs. 4, 5 and 6 show in diagrammatic form a pile carpet woven in accordance with the invention comprising a two-shot carpet weave with alternating high and low pile surface areas formed with floated high and low loops. Figs. 4 and 5 illustrate two different ways in which different groups of pile warps raised over specified pile wires are handled in accordance with the invention. Fig. 6 is a view similar to Fig. 4 but with the pile wires withdrawn.

The carpet is woven with chain warps 200, 202, stuffer warps 204, pile warps 206, 208 illustrated in Figs. 4 and 5 respectively, and upper and lower weft shots 210, 212 inserted alternately and in opposite directions. In this illustration of the invention the pile warps are strung in a single frame but are preferably controlled in two separate groups as indicated at 206 and 208 in Figs. 4 and 5 in order to maintain a balanced weaving construction and in order to produce a more effective pile surface weave as hereinafter more fully set forth.

The yarns 206, 208 are preferably of one color although as here shown with different shadings for purposes of illustration.

The loom on which the fabric is woven is provided with alternating high round pile raising wires 214, and low round pile raising wires 216 which are inserted alternately with each successive lower weft shot.

In carrying out the several steps of weaving the fabric shown in Figs. 4, 5 and 6 the shed is raised and a lower weft shot is inserted therethrough together with a low pile wire. As indicated at the right side of Figs. 4, 5 and 6 the shed is formed to locate the pile warps 206 and 208 in a raised position over the low pile wire 216, the shed is then collapsed and the lower weft shot and pile wire are beaten into the fell. A second shed is formed preparatory for the insertion of the upper weft shot 210. As shown in Fig. 4 the shed is formed to cause the pile warps 206 to be floated over and the pile warps 208 to be tied-in under the upper weft shot 210. This second shed is then collapsed and the upper weft shot 210 is beaten into the fell.

In the next succeeding cycle a shed is formed and a lower weft shot together with a high pile wire 214 are inserted, the pile warps 206 and 208 being both positioned above the lower weft shot 212 and below the level of the high pile wire 214. The shed is then collapsed and the high pile wire 214 and lower weft shot 212 are beaten into the fell. A second shed is now raised for the next upper weft shot 210. For this shot all of the pile warps 206, 208 are positioned downwardly to be tied-in beneath the upper weft shot.

A sufficient detailed description has been given to illustrate the manner in which the woven pile warps are floated over selected upper weft shots and are raised over or floated under selected pile wires.

In Figs. 4, 5 and 6 a border between the low and high loop area is formed by means of a wide floated loop which is floated over two intervening upper weft shots 210 and over one high pile wire and over the low pile wire at each side thereof, being again tied-in under the next following upper weft shot 210.

For the formation of the high loop area it will be noted that all of the warps are raised over the high pile wires 214. The pile warps 206 are tied-in beneath the preceding upper weft shot 210 to the right and are floated over the succeeding upper weft shot 210 to the left and under the next following low pile wire 216. The pile warps 208 are similarly floated over the high pile wires 214 being floated under the preceding low pile wire 216, and over the preceding adjacent upper weft shot 210, being tied-in beneath the next following upper weft shot 210 to the left. The offset arrangement of the floated loops raised over each particular pile wire has been found desirable in order to improve the weave characteristics of the carpet, to produce a more pleasing appearance, and a more effective coverage of the carpet between pile warps.

The offset arrangement of the loops in opposite directions has the further advantages that it tends to balance or avoid distortion of the individual pile wires during the weaving operation and that it also reduces to a minimum the tendency of the raised and floated pile warps to raise the pile wires under which they are floated.

It will be understood that the shedding of the pile warps is readily controlled to produce alternating high and low floated pile loop areas weftwise of the fabric, the individual pile warps 206, 208 being raised selectively, for this purpose, over either a high pile wire 214 or a low pile wire 216 and floated under the other of said wires.

It will be understood further that the floating of the individual raised pile loops in opposite directions from the pile wires over which they are raised will have the effect of producing slight offsets or irregularities in the weftwise rows of loops. These irregularities, however, are considered to be an advantage and aid still further in producing an effect which is pleasing to the eye, and an adequate coverage of the carpet ground by the pile warps.

Figs. 7, 8 and 9 of the drawings illustrate in somewhat diagrammatic form a raised pile carpet woven in accordance with the preesnt invention and having the pile surface thereof formed alternately with cut and uncut areas. The carpet weave shown is in many respects similar to that shown in Figs. 4, 5 and 6 being woven with chain warps 200, 202, stuffer warps 204, and upper and lower weft shots 210, 212 inserted alternately and in opposite directions. In this illustration of the invention the pile warps are again strung on a single frame but are preferably controlled in two separate groups to permit of a somewhat different handling in the weave. As in the previously described form of the invention a separate shed is raised for the insertion of each alternating upper and lower weft shot and pile wire inserted with the lower weft shot. In the form of the invention illustrated in Figs. 7, 8 and 9 lower weft shots and pile wires comprise alternately a round pile wire 220 and a cutting wire 222.

For weaving the uncut raised pile loop areas, all of the pile warps are floated over each successive round wire, and are also floated over the adjacent upper weft shot and under the adjacent cutting wire at one side of the round wire, being fastened in at the other side of the round wire under the next adjacent upper weft shot.

The pile warps while strung in a single frame are divided into two groups of pile warps 224 and 226 which are shedded differently to cause some pile warps raised over the round wire to be tied-in under the adjacent upper weft shot at one side of the round wire and to be floated over the upper adjacent weft shot at the other side of the round wire, whereas other pile warps raised over the round wire are tied-in beneath the adjacent upper weft shot at the other side of the round wire, and thus to maintain a balanced condition of the lateral stresses to which the wires are subjected and thereby to prevent bending or distortion of the wire in the normal upright position and also to avoid subjecting the adjacent cutting wires to excessive lifting strains.

Referring to the two end portions of Fig. 7, pile warps 224 are tied-in under the next adjacent upper weft shot 210 at the left of the round wire and are floated over the next adjacent upper weft shot and under the adjacent cutting wire 222 at the right of the round wire.

Pile warps 226 specifically illustrated in Fig. 8 are tied-in beneath the next adjacent upper weft shot 210 at the right of the round wires referred to in Fig. 7 and are floated over the adjacent upper weft shot 210 and under cutting wire 222 to the left of said round wires comprising the left and right end portions of Fig. 8.

Figs. 7, 8 and 9 illustrate the change in the shedding required to form the cut portion of the fabric. In this instance the warps 224 are raised over the cutting wire 222 and are tied-in beneath the next adjacent upper weft shot at the right of said wire and are floated over the adjacent weft shot and under the adjacent round wire 220 at the left of said cutting wire. Similarly the pile warps 226 are tied-in beneath the adjacent upper weft shot 210 at the left of each knife and are floated over the adjacent upper weft shot and under the adjacent round wire to the right of said knife. Fig. 9 shows the final form of the pile loops raised in Fig. 7 after the pile wires have been withdrawn.

The fabric woven as above described comprises the uncut raised pile areas shown at the left and right hand ends of Fig. 9 comprising high floated pile loops of the pile warps 224, 226, and a central cut area which is formed by cut loops or tufts which are tied-in beneath alternate upper weft shots, and with upper weft shots placed between each two tufts warpwise of the fabric so that an even spacing of the tufted ends is maintained in each tufted area or cut area of the fabric.

It will be understood that the shedding of the pile warps may be controlled weftwise of the fabric in the manner above described to produce alternating cut and uncut fabric areas weftwise of the fabric in accordance with the pattern which it is desired to produce.

Figs. 10, 11 and 12 of the drawings illustrate in diagrammatic form a through-to-the-back weave type fabric having raised cut and uncut pile areas. The carpet ground weave shown is similar to those previously described, being woven with chain warps 200, 202, stuffer warps 204, and upper and lower weft shots 210, 212 inserted alternately and in opposite directions. The pile warps are strung in a single frame but are preferably controlled in at least two separate groups to permit of a somewhat different handling in the weave. A separate shed is raised for the insertion of each alternate upper and lower weft shot. In the example of a through-to-the-back weave shown in Figs. 10, 11 and 12 the pile wires are inserted with succesive upper weft shots and the pile warps are tied-in under alternate lower weft shots.

For the weaving of selected cut and uncut areas the pile wires employed take the form of high pile raising cutter wires or knives 228 and, alternating therewith, low round wires 230.

As shown in Fig. 11 the cut areas are formed with floated loops from selected pile warps 232 which, looking from right to left, are raised over the cutting wires 228 and floated over the associated and following upper weft shots 210 and intermediate lower weft shot, being carried under the following low pile wire 230 and tied-in beneath the next succeeding lower weft shot 212. Other selected pile warps 234 (see Fig. 10), which are raised over the high cutting wires 228 will be tied-in beneath the next following lower weft shot 212, and are floated over the succeeding lower and upper weft shots and under the associated low pile wire 230. Figs. 10 and 11 illustrate the manner in which the pile warps 232, 234 are raised over the low loop raising pile wires 230. The pile warps 232 (Fig. 11) are tied-in beneath the next following lower weft shot 212 and are floated over the preceding lower and upper weft shots to the right of the low round wire and beneath the associated high cutting wires 228. The pile warps 234 (see Fig. 10) raised over the round wires 230 are tied-in beneath the next preceding lower weft shot 212 to the right and are floated over the following lower and upper weft shots but under the associated cutting wire 228.

Fig. 12 illustrates diagrammatically the position of the pile loops and tufts formed from pile warps 234 after the pile wires have been withdrawn. The central uncut area comprises the relatively low floated loops which are tied-in under alternate lower weft shots, and which are floated over the intermediate lower weft shot and over both intervening upper weft shots. The cut area comprises tufts of pile warp which are similarly tied-in beneath alternate lower weft shots and are formed with two upwardly extending strands which are supported between the two adjacent upper weft shots, the tufts being separated from one another by intermediate lower weft shots and two adjacent upper weft shots.

Figs. 13 and 14 of the drawings illustrate still another embodiment of the invention in which over and under wire floats are employed in combination with heavy lash to produce another group of novel and improved pile fabric weaves. The carpet weave here shown is similar to those previously described in that it is woven with chain warps 200, 202, stuffer warps 204, and upper and lower weft shots 210, 212 inserted alternately and in opposite directions. Pile wires 238 of uniform height are shown. In this form of the invention the pile warps are strung in two frames and the warps from the two frames are paired with one another so that two pile warps including one warp from each frame are combined in a single dent of the reed. In the example shown pile wires 238 are inserted successively with each lower weft shot and the pile warps are tied-in beneath the intervening upper weft shots.

In accordance with the invention a separate shed is raised for each upper weft shot and for each lower weft shot. In the fabric sample illustrated in Figs. 13 and 14 the fabric is constructed with alternating low ground pile areas and raised pile loop areas in accordance with a pattern. The drawing illustrates the manner in which two paired warps, one from each frame and guided in a single dent of the reed are woven into the fabric to form alternate ground pile and raised pile fabric areas. One of said pile warps is designated at 240, the other pile warp is designated at 242. While it may be assumed in the illustrated example that the two warps 240, 242 are of the same color it will be readily appreciated that different pattern effects such as a two-tone effect may be readily produced in the pile surface by the use of warps of different color strung in their respective frames.

The ground pile areas of the fabric are formed by tying-in one warp of each pair which for example may be the pile warp 240 under alternate upper weft shots designated at $a$, $c$, and $e$ in each of Figs. 13 and 14, and floating said pile warp 240 over the intermediate upper weft shots $b$, $d$ and $f$, and under the associated pile wires. The second pile warp 242 of the pair is tied-in under the intermediate upper weft shots $b$, $d$ and $f$ and is floated over the alternate upper weft shots $a$, $c$ and $e$ and beneath the associated pile wires. With this arrangement of the fabric ground it will be noted that all of the pile warps forming the ground are floated under all of the pile wires forming a relatively close pile weave.

The raised portion of the fabric is preferably formed by alternately burying and raising the warps of each pair. As shown in Figs. 13, 14 the pile warp 240 is raised over alternate pile wires, being tied-in beneath the adjacent upper weft shots at each side thereof, and is buried with the stuffer warps 204 beneath said adjacent intervening upper weft shots and the intervening pile wire. The second pile warp 242 of the pair is raised over each intervening pile wire, being tied-in beneath the adjacent upper weft shots at each side thereof, and being buried with the stuffer warps 204 beneath said adjacent intervening upper weft shots and said alternate pile wire.

For purposes of decoration and improved fabric design a high floated pile loop is formed adjacent the edge of the high pile area in which both the pile warps 240 and 242 of the pair are floated over at least one upper weft shot and the pile wire at each side thereof. The fabric formed in this manner has important advantages in that an extremely accurate control of the pile warp weave is made possible causing a parallel relation of the paired warps to be maintained at all times to insure a maximum coverage of the fabric ground and a mximum degree of uniformity and smooth texture.

The border shown is formed with a single pile loop raised between the ground pile area extending between upper weft shots 210*a* and 210*f*, and the large pile loop formed of pile warps 240 and 242 floated over upper weft shot 210*h* and adjacent wires. The pile loop referred to is raised between upper weft shots 210*f* and 210*g* and is formed from the pile warp 242 which would otherwise be buried between upper weft shots 210*f* and 210*h*. The addition of the single pile loop referred to in the border has the advantage that a strong anchorage is provided for the enlarged double loop or float while at the same time a very complete coverage is secured between the border and the ground pile area.

Figs. 15 and 16 of the drawings illustrate still another form of the invention which is in many respects similar to the embodiment shown in Figs. 13 and 14 and in which under and over wire floats are employed in combination with heavy lash to produce the novel and improved fabric weave.

The carpet is woven with chain warps 200, 202, stuffer warps 204 and upper and lower weft shots 210, 212 inserted alternately and in opposite directions. The pile warps are strung in two frames, and the warps from the two frames are paired with one another so that two pile warps including one warp from each frame are combined in a single dent of the reed.

In the example shown pile wires 238 are inserted successively with each lower weft shot and the pile warps are tied-in beneath the intervening upper weft shots.

A separate shed is raised for each upper weft shot and for each lower weft shot. As in the previously considered embodiment of Figs. 13 and 14 the fabric is constructed with alternating ground and raised pile loop areas in accordance with the pattern.

A novel feature of the fabric shown in Figs. 15 and 16 consists in the construction of the ground pile loop area so that each individual pile warp is tied-in only under each third upper weft shot and is floated in each instance over two intervening upper weft shots and under all of the associated pile wires. The two pile warps paired in each dent of the reed are maintained in a continuously parallel relation and the floated pile loops of each pair forming the ground pile area are staggered with relation to one another weftwise of the fabric to obtain a distinctively different pattern effect in the finished carpet and further to insure that the paired warps maintain the continuously parallel relationship desired for this type of weave.

Referring to Figs. 15 and 16 the two pile warps 246 and 248 paired in a single dent of the reed and shown by way of example as forming the fabric ground, are subsequent to the forming of the bordering rows of raised pile loops shown in Fig. 15 tied-in under adjacent upper weft shots 210 which are identified also as the first two upper weft shots shown at the right side of Fig. 16. The pile warp 246, shown as passing under the first upper weft shot at the right side of Fig. 16 is floated over two successive upper weft shots but beneath associated pile wires 238, and is then tied-in beneath the next following or fourth upper weft shot from the right in Fig. 16. The pile warp 248 is tied-in beneath the second upper weft shot which may be the second from the right as shown in Fig. 16, is then floated over two succeeding upper weft shots but under the intervening wires and is then tied-in under the next following or fifth upper weft shot from the right as viewed in Fig. 16. This pattern of weave of pile warps 246, 248 is repeated both warpwise and weftwise of the fabric to the full extent of the ground pile area called for by the pattern which it is desired to weave.

The raised pile areas of the fabric illustrated in Figs. 15 and 16 are formed in substantially the same manner as the raised pile areas described in connection with Figs. 13 and 14.

One pile warp of each pair, as for example pile warp 246, is raised over alternate pile wires, being tied-in beneath the adjacent upper weft shot at each side thereof, and being buried with the stuffer warp 204 beneath the two intervening upper weft shots and intervening pile wire 238. The second pile warp of the pair is raised over the intervening pile wire and is tied-in beneath the adjacent upper weft shot at each side thereof, being buried with the stuffer warp 204 beneath the intervening upper weft shots and alternate pile wire.

The constructions above described of the raised pile loop area utilizing heavy lash and alternating the pile loops warpwise of the fabric has the advantages of reducing to a minimum the amount of expensive pile yarn required.

It will be noted also that each raised loop is tied-in and held by two upper weft shots and also by the contact of the buried warp with stuffer warps and other carpet elements to provide a firm anchor against pulling of the raised loops.

Figs. 17, 18 and 19 illustrate another form of the invention in which two frames of pile warps are employed to produce still another important group of weaves and fabric patterns. The construction shown distinguishes from those shown in Figs. 4–9 which are examples of single frame weaves. The construction shown differs from the weaves shown in Figs. 13–16 inclusive particularly in the arrangement of the loop pile and cut pile areas to produce a heavier and more dense coverage of the fabric weave surface by the pile warps.

Referring specifically to Fig. 19 it will be noted that the group of warp ends included in each reed dent includes two chain warps 250, 252, a stuffer warp 254, and two pile warps 256, 258 of which the pile warp 256 is strung in one frame and the pile warp 258 is strung in a second frame. Only the tying-in upper weft shots 260 are illustrated in Fig. 19, the lower weft shots 262 shown in Figs. 17 and 18 having been omitted in the interest of simplicity.

In Fig. 17, starting from the right side of the drawing, it will be noted that both pile warps 256 and 258 are passed over the round wire 264, the pile warp 256 having been tied-in under, and the pile warp 258 having been floated over the preceding upper weft shot 260a. The pile warp 256 is floated over, and the pile warp 258 is tied-in under the following upper weft shot 260b. Both pile warps pass under the next preceding and the next following cutting wire designated at 266.

The two pile loops formed from the companion pile warps 256, 258 passing through a single dent of the reed, and therefore located between two separating pairs of chain warps 250, 252, provide an example of heavy lash in which both pile warps are simultaneously activated and pass over the same round wire. The two loops passing over the same pile wire are floated in opposite directions over the adjacent upper weft shot at one side of the pile wire but under the adjacent cutting wire. When the wires are withdrawn the paired pile warps in the single dent of the reed are off-set from one another in accordance with a regular recurring pattern as shown in Fig. 18.

Following the weaving of four groups of pile loops as shown in Figs. 17 and 18 the jacquard mechanism operates in the novel manner above described to cause a series of ground pile loops to be formed, of which those loops formed from pile warp 256 are floated over alternate upper weft shots 260j, l and n but under the associated round and cutting pile wires, and those loops formed from pile warp 258 are floated over the intermediate upper weft shots 260i, k, m and o but under the associated round and cutting pile wires.

A further pattern variation is shown in the left hand portion of Figs. 17, 18 and 19 in which heavy lash is employed with the alternating cutting wires 266 to produce a cut pile surface of exceptional quality and coverage. As shown in Fig. 17 both of the pile warps 256, 258 are caused to pass over a cutting wire 266, the pile warp 256 being floated over the preceding tying-in upper weft shot 260p and being tied-in under the next succeeding weft shot 260q, whereas the companion pile warp 258 is tied-in under the preceding upper weft shot 260p and is floated over the next succeeding upper weft shot 260q. Both of the pile warps are floated under the next adjacent round wire at each side of the cutting wire 266. The two pile loops raised over each cutting wire 266 are thus off-set from one another as floats. This cycle is repeated as shown in Figs. 17 and 18 for the insertion of at least three successive cutting wires 266. When the wires are now withdrawn a cut pile area is formed as shown in Fig. 18 in which tufts are formed, the tufts formed from the pile warps 256 being looped under alternate upper weft shots, whereas the tufts formed from the pile warp 258 are looped under the intermediate upper weft shots so that two yarn tufts are formed between each successive pair of upper weft shots for each dent of the reed, thus producing a very dense uniform coverage of the area.

Fig. 19 illustrates clearly the fact that variations in the construction and appearance of the pile surface of the fabric may be made readily in a weftwise as well as a warpwise direction. The ground pile area indicated in Figs. 17 and 18 is shown in Fig. 19 as extending in a diagonal direction with respect to the warp and weft of the fabric. The two pile warps 256 and 258 of the lower pair, shown in Fig. 19 as held in a second dent of the reed between the two pairs of chain warps 250 and 252, are floated in alternation over successive upper weft shots 260a to 260g, but under the associated wires to form a ground pile area. Between upper weft shots 260g and 269m the pile warps of the lower pair are raised as floats in staggered relation over cutting wires 266 and over one or the other adjacent upper weft shot forming floats in staggered relation to one another to form a cut pile area similar to the cut pile area above described in connection with Figs. 17 and 18, but off-set therefrom so that a diagonally extending border is provided between the ground pile and cut pile areas produced by the weaving of the pile warps in the two dents. Between upper weft shot 260m and 260q the pile warps of the lower pair in Fig. 19 are woven in the manner above described to form a ground pile area. Between upper weft shots 260q and 260u another cut pile area is woven, the tufted ends appearing between the upper weft shots 260r, s, t and u.

With respect to each of the illustrations given of fabric weaves shown in the drawings it will be understood that various well known variations of carpet weaving are contemplated within the scope of the invention. The construction shown in Figs. 14 and 16 in which a single chain warp is passed through each successive dent of the reed is, for example, freely interchangeable with the construction shown in Fig. 19 in which two chain warps are employed.

The invention having been described what is claimed is:

1. In weaving carpets by means of a loom having a jacquard the method comprising, during one complete rotation of the lower loom shaft, selecting a plurality of pile yarn warps, forming a shed of the selected plurality of pile yarn warps and the remainder of the pile yarn warps, inserting a pile wire beneath the selected plurality of pile yarn warps and above the remainder of the pile yarn warps and simultaneously inserting a weft shot beneath the selected plurality of pile yarn warps, beating up the pile wire and the weft shot into the fell of the carpet, collapsing said shed, selecting a second plurality of pile yarn warps, forming a second shed of the second plurality of pile yarn warps and the second remainder of the pile yarn warps, inserting a second weft shot beneath the second plurality of pile yarn warps and above the second remainder of the pile yarn warps, beating up the second weft shot into the fell of the carpet, and collapsing the second shed.

2. In weaving carpets by means of a loom having a jacquard the method comprising, during one complete rotation of the lower loom shaft, selecting a plurality of pile yarn warps, forming a shed of the selected plurality of pile yarn wraps and the remainder of the pile yarn warps, inserting a pile wire beneath the selected plurality of pile yarn warps and above the remainder of the pile yarn warps and simultaneously inserting a lower weft shot beneath the selected plurality of pile yarn warps, beating up the pile wire and the lower weft shot into the fell of the carpet, collapsing said shed, selecting a second plurality of pile yarn warps, forming a second shed of the second plurality of pile yarn warps and the second remainder of the pile yarn warps, inserting an upper weft shot beneath the second plurality of pile yarn warps and above the second remainder of the pile yarn warps, beating up the upper weft shot into the fell of the carpet, and collapsing the second shed.

3. In weaving carpets by means of a loom having a jacquard the method comprising, during one complete rotation of the lower loom shaft, selecting a plurality of pile yarn warps, forming a shed of the selected plurality of pile yarn warps and the remainder of the pile yarn warps, inserting a pile wire beneath a selected plurality of pile yarn warps and above the remainder of the pile yarn warps and simultaneously inserting an upper weft shot beneath the selected plurality of pile yarn warps, beating up the pile wire and the upper weft shot into the fell of the carpet, collapsing said shed, selecting a second plurality of pile yarn warps, forming a second shed of the second plurality of pile yarn warps and the second remainder of the pile yarn warps, inserting a lower weft shot beneath the second plurality of pile yarn warps and above the second remainder of the pile yarn warps, beating up the lower weft shot into the fell of the carpet, and collapsing the second shed.

4. In weaving carpets by means of a loom having a jacquard the method comprising, during one complete rotation of the lower loom shaft, selecting a plurality of pile yarn warps, forming a shed of the selected plurality of pile yarn warps and the remeainder of the pile yarn warps, inserting a pile wire beneath the selected plurality of pile yarn warps and above the remainder of the pile yarn warps and simultaneously inserting a weft shot beneath the selected plurality of pile yarn warps and the remainder of the pile yarn warps, beating up the pile wire and the weft shot into the fell of the carpet, collapsing said shed, selecting a second plurality of pile yarn warps, forming a second shed of the second plurality of pile yarn warps and the second remainder of the pile yarn warps, inserting a second weft shot beneath the second plurality of pile yarn warps and above the second remainder of the pile yarn warps, beating up the second weft shot into the fell of the carpet, and collapsing the second shed.

5. In weaving carpets by means of a loom having a jacquard the method comprising, during one complete rotation of the lower loom shaft, selecting a plurality of pile yarn warps, forming a shed of the selected plurality of pile yarn warps and the remainder of the pile yarn warps, inserting a pile wire beneath the selected plurality of pile yarn warps and above the remainder of the pile yarn warps and simultaneously inserting a weft shot beneath the selected plurality of pile yarn warps and above the remainder of the pile yarn warps, beating up the pile wire and the weft shot into the fell of the carpet, collapsing said shed, selecting a second plurality of pile yarn warps, forming a second shed of the second plurality of pile yarn warps and the second remainder of the pile yarn warps, inserting a second weft shot beneath the second plurality of pile yarn warps and above the second remainder of the pile yarn warps, beating up the second weft shot into the fell of the carpet, and collapsing the second shed.

6. In weaving carpets by means of a loom having a jacquard the process comprising, during one complete rotation of the lower loom shaft, selecting a plurality of pile yarn warps forming a shed of the pile warps by raising the selected plurality of pile yarn warps and simultaneously holding the remainder of the pile yarn warps stationary, inserting a pile wire beneath the selected plurality of pile yarn warps and above the remainder of the pile yarn warps, and simultaneously inserting a lower weft shot beneath the selected plurality of pile yarn warps and the remainder of the pile yarn warps, beating up the pile wire and the lower weft shot into the fell of the carpet, collapsing said shed by lowering the selected plurality of pile yarn warps and simultaneously holding the remainder of the pile yarn warps stationary, selecting a second plurality of pile yarn warps, forming a second shed of the pile yarn warps by lowering the second remainder of the pile yarn warps and simultaneously holding the second plurality of pile yarn warps stationary, inserting an upper weft shot beneath the secondly selected plurality of pile yarn warps and above the second remainder of the pile yarn warps, beating up the upper weft shot into the fell of the carpet, and collapsing the second shed by raising the second remainder of the pile yarn warps and simultaneously holding the second plurality of pile yarn warps stationary.

7. In a two-shot jacquard weave carpet having upper and lower weft shots inserted through the fabric in opposite directions, chain warps, stuffer warps, and pile warps, the combination in said carpet of pile warps arranged in pairs between chain warps with the two warps of each pair maintained in a continuing parallel relation warpwise of the fabric, one pile warp of each pair being passed over selected upper weft shots as a float and tied-in under the adjacent upper weft shot at each side of the float, the other pile warp of each pair being passed as a float over separately selected upper weft shots including other upper weft shots adjacent said first selected weft shots and tied-in under the adjacent upper weft shot at each side of the float, whereby the floats of each pair are offset from one another weftwise of the fabric and are maintained in said continuous parallel relationship warpwise.

8. In a two-shot jacquard weave carpet having upper and lower weft shots inserted through the fabric alternately and in opposite directions, chain warps, stuffer warps, and pile warps, the combination in said carpet of said pile warps arranged in pairs between chain warps with the two warps of each pair in a continuing parallel relation warpwise of the fabric, one pile warp of each pair being floated over alternate upper weft shots and under the adjacent pile wires at each side thereof as under-the-wire floats and being tied-in under the intermediate upper weft shots, and the other pile warp of each pair being floated over the intermediate upper weft shots and under the adjacent pile wires, and tied-in under said alternate upper weft shots to form a ground pile wherein the floated portions of the two pile warps of each pair are offset weftwise of the fabric and in continuously parallel relationship warpwise of the fabric.

9. In a two-shot jacquard weave carpet having upper and lower weft shots inserted alternately and in opposite directions, chain warps, stuffer warps and pile warps, the combination in said carpet of said pile warps arranged in pairs between chain warps with the two warps of each pair maintained in a continuing parallel relation warpwise of the fabric ground pile area formed with one pile warp of each pair passing as a float over selected upper weft shots and tied-in under the adjacent upper weft shot at each side of the float, and with the other pile warp of each pair passing as a float over separately selected upper weft shots including other upper weft shots adjacent said first selected weft shots and tied-in under the adjacent upper weft shot at each side of the float, so that the floats of each pair are offset from one another weftwise of the fabric, and pile loop areas formed with the pile warps of each pair raised alternately between successively inserted upper weft shots to form series of raised loops warpwise of the fabric which are formed alternately from one and then the other warp of each pair.

10. In a two-shot jacquard weave carpet having upper and lower weft shots inserted alternately and in opposite directions, chain warps, stuffer warps, and pile warps, the combination in said carpet of said pile warps arranged in pairs between chain warps with the two warps of each pair maintained in a continuing parallel relation warpwise of the fabric, ground pile areas formed with one pile warp of each pair passing as a float over selected upper weft shots and tied in under the adjacent upper weft shot at each side of the float and with the other pile warp of each pair passing as a float over separately selected upper weft shots including other upper weft shots adjacent said first selected weft shots and tied-in under the adjacent upper weft shot at each side of the float, so that the floats of each pair are offset from one another weftwise of the fabric, raised pile loop areas formed with the pile warps of each pair raised alternately between successively inserted upper weft shots to form series of raised loops warpwise of the fabric which are formed alternately from one and then the other warp of each pair, and a floated pile loop border between said ground and raised pile fabric areas which comprises a series of raised pile loop floats of both warps of the pair, each said pile loop float being floated over at least one upper weft shot and tied-in under the adjacent upper weft shot at each side of the float.

11. In a two-shot jacquard weave carpet having upper and lower weft shots inserted alternately and in opposite directions, chain warps, stuffer warps, and pile warps, the combination in said carpet of said pile warps arranged in pairs between chain warps with the two warps of each pair maintained in a continuing parallel relation warpwise of the fabric, ground pile areas formed with one pile warp of each pair passing as a float over selected upper weft shots and tied-in under the adjacent upper weft shot at each side of the float and with the other pile warp of each pair passing as a float over separately selected upper weft shots including other upper weft shots adjacent said first selected weft shots and tied-in under the adjacent upper weft shot at each side of the float, so that the floats of each pair are offset from one another weftwise of the fabric, raised pile loop areas formed with the pile warps of each pair raised alternately between successively inserted upper weft shots to form series of raised loops warpwise of the fabric which are formed alternately from one and then the other warp of each pair, and having in said raised pile loop areas an occasional loop of greater height than said alternate loops, said higher loops floating over at least one upper weft shot and being tied-in under the adjacent upper weft shot at each side of the float.

12. In a two-shot jacquard weave carpet having chain warps, stuffer warps, pile warps, and upper and lower weft shots inserted alternately and in opposite directions, the weft shots inserted in one of said directions being pile warp tying-in weft shots, and the pile warps being arranged in pairs between two chain warps with the two warps of each pair passing as floats over selected tying-in weft shots and tied-in under the adjacent tying-in weft shot at each side of the float, adjacent groups of said floats being of different heights, and separated by a border comprising large loops floated over a plurality of said tying-in weft shots.

13. In the manufacture of a two-shot jacquard weave carpet having chain warps, stuffer warps, and pile warps strung in at least two frames and with each warp of one frame paired with a warp of a second frame in a dent of the reed between chain warps, upper and lower weft shots inserted through the fabric alternately and in opposite directions, the method of weaving said carpet which comprises for each weaving cycle forming a shed, inserting a weft shot in the one direction, and beating the shot into the fell, forming a second shed, inserting a weft shot in the reverse direction, inserting a pile wire therewith, and beating said latter shot and wire into the fell, and controlling said sheds to cause the two warps of each pair to be tied-in separately under adjacent following weft shots inserted in the one direction, each pile warp to be floated over at least one weft shot inserted in said one direction and over the two adjacent weft shots inserted in the reverse direction, and to be tied-in separately under different following weft shots inserted in the one direction, whereby the floating pile loops formed by the two pile warps of each pair are offset from one another, and are thereby held in a continuously parallel relationship.

14. In the manufacture of a two-shot jacquard weave carpet having chain warps, stuffer warps, and pile warps strung in at least two frames and with each warp of one frame paired with a warp of a second frame in a dent of the reed between chain warps, upper and lower weft shots inserted through the fabric alternately and in opposite directions, the method of weaving said carpet which comprises for each weaving cycle forming a shed, inserting a weft shot in the one direction, and beating the shot into the fell, forming a second shed, inserting a weft shot in the reverse direction, and a pile wire therewith, and beating said latter shot and wire into the fell, and controlling said sheds to cause the two warps of each pair to be tied-in separately under adjacent following weft shots inserted in the one direction, each of said warps to be floated over at least one weft shot inserted in the one direction and over the immediately adjacent weft shots inserted in the reverse direction, but under the associated wires, and to be tied-in separately under different weft shots inserted in the one direction to form a ground pile surface with a continuously parallel relationship between the warps of each pair.

15. In the manufacture of a two-shot jacquard weave carpet having chain warps, stuffer warps, and pile warps strung in at least two frames and with each warp of each frame paired with a warp of a second frame in a dent of the reed between chain warps, and upper and lower weft shots inserted through the fabric alternately and in opposite directions, the method of weaving said carpet which comprises for each weaving cycle forming a shed, inserting an upper weft shot, beating the shot into the fell, forming a second shed, inserting a lower weft shot in the reverse direction, and beating said lower weft shot into the fell, and controlling said sheds to pass one pile warp of each pair over selected upper weft shots as a float and to tie-in each pile warp under the adjacent upper weft shot at each side of the float, and to pass the other pile warp of each pair as a float over other selected upper weft shots adjacent said selected weft shots and to tie-in said other pile warps under the adjacent upper weft shot at each side of the float, whereby the floats formed by the two pile warps are offset from one another weftwise of the fabric and are maintained in a continuously parallel relationship warpwise of the fabric.

16. In the manufacture of a two-shot jacquard weave carpet having chain warps, stuffer warps, and pile warps strung in at least two frames and with each warp of each frame paired with a warp of a second frame in a dent of the reed between chain warps, and upper and lower weft shots inserted through the fabric alternately and in opposite directions, the method of weaving said carpet which comprises for each weaving cycle forming a shed, inserting an upper weft shot, beating the shot into the fell, forming a second shed, inserting a lower weft shot in the reverse direction, and beating said lower weft shot into the fell, and controlling said sheds for the formation of ground pile areas to pass the two pile warps of each pair over individually selected adjacent upper weft shots and under the adjacent pile wires as under-the-wire floats offset from one another weftwise of the fabric, and to tie-in each said pile warp under the adjacent upper weft shots at each side of the float, and further controlling said sheds for the formation of a raised pile area to tie-in both pile warps of each pair under each successive upper weft shot, and to raise the two warps in alternation over the successively inserted pile wires.

17. The method of manufacture of a two-shot jacquard weave carpet according to claim 16 which comprises the further step of controlling the sheds for the formation of a floated pile loop border between the ground and raised pile fabric areas to pass both pile warps of each pair over an upper weft shot and over the adjacent pile wires at each side thereof as floats, and to tie-in said floats under the adjacent upper weft shot at each side of the float.

18. In the manufacture of a two-shot jacquard weave carpet having chain warps, stuffer warps, and pile warps strung in at least two frames and with each warp of one frame paired with a warp of a second frame in a dent of the reed between chain warps, and upper and lower weft shots inserted through the fabric alternately and in opposite directions, the method of weaving said carpet which comprises for each weaving cycle forming a shed, inserting an upper weft shot and beating the shot into the fell, forming a second shed, inserting a lower weft shot in the reverse direction, inserting a pile wire therewith, and beating said lower weft shot and wire into the fell, and controlling said sheds to pass one pile warp of each pair over selected upper weft shots and under the adjacent pile wires as under-the-wire floats, and to tie-in said floated pile warps under adjacent successively inserted upper weft shots at each side of the float, and to pass the other pile warp of each pair over other selected upper weft shots adjacent said selected upper weft shots and under the adjacent pile wires as other under-the-wire floats, and to tie-in said other pile warps of each pair under adjacent successively inserted upper weft shots at each side of said other under-the-wire floats, and thereby to form a fabric pile ground of under-the-wire floats from the two pile warps of each pair offset and with the two warps of each pair in continuously parallel relationship.

19. In the manufacture of a two-shot jacquard weave carpet having chain warps, stuffer warps, and pile warps strung in at least two frames and with each warp of one frame paired with a warp of a second frame in a dent of the reed between chain warps, and upper and lower weft shots inserted through the fabric alternately and in opposite directions, the method of weaving said carpet which comprises for each weaving cycle forming a shed, inserting an upper weft shot, and beating the shot into the fell, forming a second shed, inserting a lower weft shot in the reverse direction, inserting a pile wire therewith, and beating said lower weft shot and wire into the fell, and controlling said sheds to pass one pile warp of each pair over alternate upper weft shots and under the adjacent pile wires at each side thereof as under-the-wire floats and to tie-in said floated pile warp under the intermediate upper weft shots, and to pass the other pile warp of each pair over the intermediate upper weft shots and under the adjacent pile wires at each side of said intermediate upper weft shots as other under-the-wire floats, and thereby to form a fabric pile ground of under-the-wire floats with the two pile warps of each pair offset and with the two warps of each pair in continuously parallel relationship.

20. In a two-shot jacquard weave carpet having upper and lower weft shots inserted through the fabric in opposite directions, chain warps, stuffer warps, and pile warps, the combination in said carpet of ground pile areas formed with said pile warps passing as under-the-wire floats over selected weft shots inserted in the one direction and over the adjacent weft shots inserted in the opposite direction, each of said floats being tied-in beneath the preceding and following adjacent weft shots inserted in said one direction at each side of the float.

21. In a two-shot jacquard weave carpet having upper and lower weft shots inserted through the fabric in opposite directions, the weft shots inserted in one direction only being tying-in weft shots, chain warps, stuffer warps, and pile warps arranged in pairs between chain warps, the combination in said carpet of ground pile areas formed with said pairs of pile warps passing together as under-the-wire floats over selected tying-in weft shots inserted in the one direction and over the adjacent weft shots inserted in the opposite direction, each of said floats being tied-in beneath the preceding and following adjacent weft shots inserted in the one direction at each side of the float.

22. In a two-shot jacquard weave carpet having upper and lower weft shots inserted through the fabric in opposite directions, chain warps, stuffer warps, and pile warps, the combination in said carpet of ground pile areas formed with said pile warps passing as under-the-wire floats over selected upper weft shots and over the adjacent lower weft shots, each of said floats being tied-in beneath the preceding and following adjacent upper weft shots at each side of the float.

23. In a two-shot jacquard weave carpet having upper and lower weft shots inserted through the fabric in opposite directions, chain warps, stuffer warps, and pile warps, the combination in said carpet of ground pile areas formed with selected pile warps passed as floats over alternate upper weft shots, and tied-in beneath the intermediate upper weft shots, and with other selected pile warps passed as floats over the intermediate upper weft shots, and tied-in beneath the alternate weft shots.

24. In the manufacture of a two-shot jacquard weave carpet having chain warps, stuffer warps, and pile warps, upper and lower weft shots inserted through the fabric alternately and in opposite directions, the method of weaving said carpet which comprises for each weaving cycle forming a shed, inserting a weft shot in the one direction, and beating the shot into the fell, forming a second shed, inserting a weft shot in the reverse direction, inserting a pile wire therewith, and beating said latter shot and wire into the fell, and controlling said sheds for the formation of a below-the-wire floated loop fabric area to pass each of selected pile warps as floats over at least one weft shot inserted in the one direction and under the adjacent pile wires at each side thereof as under-the-wire floats, and to tie-in said pile warps beneath the preceding and following weft shots inserted in said one direction at each side of the float, and repeating said steps in accordance with the pattern to produce said area.

25. In the manufacture of a two-shot jacquard weave carpet having chain warps, stuffer warps, pile warps and upper and lower weft shots inserted through the fabric alternately and in opposite directions, the method of weaving said carpet which comprises for each weaving cycle forming a shed, inserting an upper weft shot, and beating the shot into the fell, forming a second shed, inserting a lower weft shot in the reverse direction, inserting a pile wire therewith, and beating said lower weft shot and wire into the fell, and controlling said sheds for the formation of a below-the-wire floated loop fabric area to pass each of selected pile warps as floats over at least one upper weft shot and under the adjacent pile wires at each side thereof, and to tie-in said pile warp beneath the preceding and following upper weft shots at each side of the float, and repeating said steps in accordance with the pattern to produce said area.

26. In the manufacture of a two-shot jacquard weave carpet having chain warps, stuffer warps, and pile warps and upper and lower weft shots inserted through the fabric alternately and in opposite directions, the method of weaving said carpet which comprises for each weaving cycle forming a shed, inserting an upper weft shot, beating the shot into the fell, forming a second shed, inserting a lower weft shot in the reverse direction, inserting a pile wire therewith and beating said lower weft shot and wire into the fell, and controlling said sheds for the formation of a below-the-wire floated loop fabric area to pass each of selected pile warps as floats and over alternate upper weft shots but under the associated pile wires, and to tie-in said pile warps beneath intermediate upper weft shots and repeating said steps in accordance with the pattern to produce said area.

27. In the manufacture of a two-shot jacquard weave carpet having chain warps, stuffer warps, pile warps, and upper and lower weft shots inserted through the fabric alternately and in opposite directions, the method of weaving said carpet which comprises for each weaving cycle forming a shed, inserting an upper weft shot, beating the shot into the fell, forming a second shed, inserting a lower weft shot in the reverse direction, inserting a pile wire therewith, selected wires of said successively inserted wires being cutting wires, beating said lower weft shot and wire into the fell, and controlling said sheds for the formation of a cut pile fabric area which comprises the steps of passing each pile warp of said cut pile area over a selected cutting wire, over an upper weft shot at one side of said cutting wire and under the pile wire adjacent thereto as floats, tying-in said selected pile warp under the preceding and following upper weft shot at each side of said floats, and withdrawing said knife to cut the loops.

28. In the manufacture of a two-shot jacquard weave carpet having chain warps, stuffer warps, pile warps, and upper and lower weft shots inserted through the fabric alternately and in opposite directions, the method of weaving said carpet which comprises for each weaving cycle forming a shed, inserting an upper weft shot, beating the shot into the fell, forming a second shed, inserting a lower weft shot in the reverse direction, inserting a pile wire therewith, selected wires of said successively inserted wires being cutting wires, beating said lower weft shot and wire into the fell, and controlling said sheds for the formation of a cut pile fabric area, which comprises the steps of passing selected pile warps over a selected cutting wire, over the preceding upper weft shot and under the pile wire adjacent thereto as floats, and tying-in said selected pile warps under the preceding and following upper weft shot at each side of said floats, and passing other selected pile warps over said cutting wire and over the next succeeding upper weft shot, and under the associated pile wire as floats, and tying-in said other selected pile warps under the preceding and following upper weft shots at each side of said latter float.

29. In the manufacture of a two-shot jacquard weave carpet having chain warps, stuffer warps, pile warps, and upper and lower weft shots inserted through the fabric alternately and in opposite directions, the method of weaving said carpet which comprises for each weaving cycle forming a shed, inserting an upper weft shot, beating the shot into the fell, forming a second shed, inserting a lower weft shot in the reverse direction, inserting a pile wire therewith, at least each alternately inserted wire comprising a cutting wire, beating each lower weft shot and wire into the fell, and controlling said sheds to pass selected pile warps over each alternate upper weft shot, over a cutting wire associated therewith, and under the intermediate wire at the opposite side of each said alternate upper weft shot as floats, and to tie-in said pile warps at each side of each float under each intermediate upper weft shot, and thereafter to withdraw each said cutting wire to sever the pile warps passed over said cutting wire.

30. In the manufacture of a two-shot jacquard weave carpet having chain warps, stuffer warps, pile warps, and upper and lower weft shots inserted through the fabric alternately and in opposite directions, the method of weaving said carpet which comprises for each weaving cycle forming a shed, inserting an upper weft shot, beating the shot into the fell, forming a second shed, inserting a lower weft shot in the reverse direction, inserting a pile wire with each lower weft shot, selected successively inserted wires being round wires and others of said successively inserted wires being cutting wires, beating each lower weft shot and wire into the fell, and controlling said sheds for the formation of a cut pile area in the formation of which selected pile warps are passed over a cutting wire, over an upper weft shot adjacent said cutting wire, and under the wire at the side of the upper weft shot opposite said cutting wire as floats, tying-in said selected pile warps under the preceding and following upper weft shot at each side of the float and withdrawing said cutting wire to cut the warps, and controlling said sheds for the formation of a loop pile area which comprises the steps of passing in forming each loop to pass selected pile warps over a round wire and over an upper weft shot adjacent thereto and under the wire at the opposite side of upper weft shot as floats, and tying-in said selected pile warps under the preceding and following upper weft shot at each side of each float.

31. In the manufacture of a two-shot jacquard weave carpet having chain warps, stuffer warps, pile warps, and upper and lower weft shots inserted through the fabric alternately and in opposite directions, the method of weaving said carpet which comprises for each weaving cycle forming a shed, inserting an upper weft shot, beating the shot into the fell, forming a second shed, inserting a lower weft shot in the reverse direction, inserting a pile wire therewith, said wires being alternately round wires and cutting wires, and beating each lower weft shot and wire into the fell, and controlling said sheds for the formation of cut pile areas by passing selected pile warps over said alternately inserted cutting wires, over an upper weft shot adjacent each cutting wire, and under the round wire at the other side of said upper weft shot as floats, and tying-in said pile warps beneath each intermediate upper weft shot, and controlling said sheds for the formation of loop pile areas in said fabric, by forming said other selected pile warps over said alternately inserted round wires over an adjacent upper weft shot, and under the cutting wire at the other side of said upper weft shot as floats, and tying-in each said pile warp under the intervening upper weft shot at each end of each float.

32. In the manufacture of a two-shot jacquard weave carpet having chain warps, stuffer warps, pile warps, and upper and lower weft shots inserted through the fabric alternately and in opposite directions, the weft shots in one direction being tying-in weft shots, the method of weaving said carpet which comprises for each weaving cycle forming a shed, inserting a weft shot in one direction, beating the shot into the fell, forming a second shed, inserting a weft shot in the reverse direction, beating said reverse weft shot into the fell, inserting a pile wire to be beaten into the fell with each weft shot in the reverse direction, selected wires being cutting wires, and controlling said sheds for the formation of a cut pile fabric area, to form each cut loop passing a selected pile warp over a selected cutting wire, over a tying-in weft shot at one side of said cutting wire as a float, and under the pile wire adjacent said latter tying-in weft shot, tying-in said selected pile warp under the next adjacent tying-in weft shot at each side of the float, and withdrawing said cutting wire to cut the pile loop.

33. In the manufacture of a two-shot jacquard weave carpet having chain warps, stuffer warps, pile warps, and upper and lower weft shots inserted through the fabric alternately and in opposite directions, the weft shots in one direction being tying-in weft shots, the method of weaving said carpet which comprises for each weaving cycle raising a shed, inserting a weft shot in one direction, beating the shot into the fell, forming a second shed, inserting a weft shot in the reverse direction, beating said reverse weft shot into the fell, inserting a pile wire to be beaten into the fell with each weft shot in the reverse direction, selected wires being knives, and controlling said sheds for the formation of a cut pile fabric area, to form each of selected cut loops passing each of selected pile warps over a cutting wire, over the following tying-in weft shot, and under the next following wire as a float, and tying-in said selected pile warps under adjacent tying-in weft shots at each side of the float, and passing other selected pile warps over said cutting wire, and over the preceding tying-in weft shot and preceding wire adjacent thereto as a float, and tying-in said other pile warps beneath adjacent tying-in weft shots at each side of said latter floats, and withdrawing the cutting wire to cut said floated pile loops.

34. In the manufacture of a two-shot jacquard weave carpet having chain warps, stuffer warps, pile warps, and upper and lower weft shots inserted through the fabric alternately and in opposite directions, the weft shots in the reverse direction being tying-in weft shots, the method of weaving said carpet which comprises for each weaving cycle forming a shed, inserting a weft shot in one direction, beating the shot into the fell, forming a second shed, inserting a weft shot in the reverse direction, beating said reverse weft shot into the fell, inserting a pile wire to be beaten into the fell with each weft shot in the reverse direction, said wires comprising selected cutting wires and round wires, and controlling said sheds for the formation of a raised pile loop area in said fabric, to form each said raised loop passing a selected pile warp over a round wire, over a tying-in weft shot at one side of said wire and under the pile wire adjacent said latter tying-in weft shot as a float, and tying-in said selected pile warp under the next adjacent tying-in weft shot at each side of the float, and further controlling said sheds for the formation of a cut pile fabric area, to form each cut loop passing another selected pile warp over a cutting wire, over a tying-in weft shot at one side of said cutting wire, and under the pile wire adjacent said latter tying-in weft shot as a float, tying-in said other selected pile warp under the next adjacent tying-in weft shot at each side of said latter float, and wthdrawing said cutting wire to cut the loop.

35. In the manufacture of a two-shot jacquard weave carpet having chain warps, stuffer warps, pile warps, and upper and lower weft shots inserted through the fabric alternately and in opposite directions, the method of weaving said carpet which comprises for each weaving cycle raising a shed, inserting a lower weft shot, beating the shot into the fell, raising a second shed, inserting an upper weft shot in the reverse direction, inserting a pile raising wire therewith, selected wires of said successively inserted wires being cutting wires, beating said upper weft shot and wire into the fell, and controlling said sheds for the formation of a cut pile through-to-the-back weave, for each pile loop passing a selected pile warp over a cutting wire, over a lower weft shot at one side of said cutting wire, over the next adjacent upper weft shot, and under the next adjacent pile wire as a float, tying-in said pile warp beneath adjacent lower weft shots at each side of said float to form the loop, and withdrawing said cutting wire to cut the loop.

36. In the manufacture of a two-shot jacquard weave carpet having chain warps, stuffer warps, pile warps, and upper and lower weft shots inserted through the fabric alternately and in opposite directions, the method of weaving said carpet which comprises for each weaving cycle forming a shed, inserting a lower weft shot, beating the shot into the fell, forming a second shed, inserting an upper weft shot in the reverse direction, inserting a pile wire therewith, selected wires of said successively inserted wires being cutting wires, beating said upper weft shot and wire into the fell, and for the formation of a cut pile through-to-the-back weave controlling said sheds to form selected loops by passing selected pile warps over a cutting wire, over the lower weft shot preceding the cutting wire, over the next preceding upper weft shot and under the associated wire as floats, tying-in said pile warps beneath adjacent lower weft shots at each side of said floats to form the loops, and further controlling said sheds to form said other selected loops passing other selected pile warps over said cutting wire, over the lower weft shot following the cutting wire, over the next following upper weft shot and under the associated wire as floats, tying-in said other pile warps beneath adjacent lower weft shot at each side of said latter floats, and withdrawing said cutting wire to cut the loops.

37. In the manufacture of a two-shot jacquard weave carpet having chain warps, stuffer warps, and pile warps, upper and lower weft shots inserted through the fabric alternately and in opposite directions, high and low pile wires arranged to be inserted in alternation simultaneously with successive lower weft shots, the method of weaving said carpet which comprises for each weaving cycle forming a shed, inserting an upper weft shot through the shed, and beating said upper weft shot into the fell, forming a second shed, inserting a lower weft shot and a pile wire therewith through said shed, and beating said lower weft shot and wire into the fell, and controlling said sheds to produce selected high and low loop pile areas in said carpet which for each loop comprises the steps of raising each pile warp within a selected area over a selected one of two adjacent high and low pile wires, and over an adjacent upper weft shot at one side of said selected wire, but under the next adjacent wire as a float, and tying-in said pile warp under the next adjacent upper weft shot at each side of the float.

38. In the manufacture of a two-shot jacquard weave carpet having chain warps, stuffer warps, and pile warps, upper and lower weft shots inserted through the fabric alternately and in opposite directions, the method of weaving said carpet which comprises for each weaving cycle inserting a lower weft shot in the reverse direction, inserting a pile wire with each successive lower weft shot, and beating said lower weft shot and wire into the fell, and controlling said sheds for the formation of a loop pile area which comprises the steps of passing alternate pile warps over a selected pile wire, over an adjacent upper weft shot at one side of the wire, and under the next adjacent wire as floats, passing intervening pile warps over said pile wire, over the adjacent upper weft shot at the other side of said wire, and under the next adjacent wire as floats, and tying-in each of said pile warps under the adjacent upper weft shot at each side of the float.

39. In the manufacture of a two-shot jacquard weave carpet having chain warps, stuffer warps, and pile warps, upper and lower weft shots inserted through the fabric alternately and in opposite directions, high and low pile wires arranged to be inserted in alternation simultaneously with successive lower weft shots, the method of weaving said carpet which comprises for each weaving cycle forming a shed, inserting an upper weft shot, and beating the upper weft shot into the fell, raising a second shed, inserting a lower weft shot and a pile wire therewith through said shed, and beating said lower weft shot and wire into the fell, and controlling said sheds to produce weftwise rows of selected high and low pile loops which for each row of high pile loops comprises raising selected pile warps over a high pile wire and floating said loops in alternation over the adjacent upper weft shot at opposite sides of said high wire and under the next adjacent low pile wire as floats, and tying-in each selected pile warp under the preceding and following upper weft shot at each side of the float, and which for each row of low pile loops comprises raising other selected pile warps over a low pile wire adjacent to the high pile wire, and floating said other selected pile warps in alternation over the adjacent upper weft shots at opposite sides of said low pile wire and under the next adjacent high pile wire, and tying-in each other selected pile warp under the preceding and following weft shot adjacent the floats.

40. In the manufacture of a two-shot jacquard weave carpet having upper and lower weft shots, chain warps, stuffer warps and pile warps inserted through a fabric alternately and in opposite directions, the method of weaving said carpet which comprises for each weaving cycle, forming a shed, inserting an upper weft shot in one direction, beating the shot into the fell, forming a second shed, inserting a lower weft shot in the reverse direction, inserting high and low pile wires in alternation with successive lower weft shots, and beating said lower weft shot and wire into the fell, and controlling said sheds for the formation of a low loop pile area which for each low loop comprises the steps of passing a selected pile warp over a low pile wire, over an adjacent upper weft shot, and under the next adjacent wire as a float, and tying-in said pile warp under the adjacent upper weft shot at each side of said float, and further controlling said sheds for the formation of high loop pile area which for each high loop comprises the steps of passing a selected pile warp over a high pile wire, over an adjacent upper weft shot, and under the next adjacent wire as a float, and tying-in said pile warp under the adjacent upper weft shot at each side of said latter float.

41. In the manufacture of a two-shot jacquard weave carpet having chain warps, stuffer warps, and pile warps strung in at least two frames, and with each warp of one frame paired with a warp of a second frame in a dent of the reed between chain warps, upper and lower weft shots inserted through the fabric alternately and in opposite directions, the method of weaving said carpet which comprises for each weaving cycle forming a shed, inserting an upper weft shot, and beating the shot into the fell, forming a second shed, inserting a lower weft shot in the reverse direction, inserting a pile wire therewith, and beating said latter shot and wire into the fell, and controlling said sheds for the formation of a loop pile area which comprises the steps of passing the pile warps from one frame of each pair over a selected pile wire, over an adjacent upper weft shot at one side of the wire and under the next adjacent wire as floats, passing the pile warps from the other frame of each pair over said pile wire, over the adjacent upper weft shot at the other side of said wire, and under the next adjacent wire as floats, and tying-in each of said pile warps under the adjacent upper weft shot at each side of the float.

42. In the manufacture of a two-shot jacquard weave carpet having chain warps, stuffer warps, pile warps strung in at least two frames and with each warp of one frame paired with a warp of a second frame between chain warps in a dent of the reed, and upper and lower weft shots inserted through the fabric alternately and in opposite directions, the method of weaving said carpet which comprises for each weaving cycle forming a shed, inserting an upper weft shot, and beating the shot into the fell, forming a second shed, inserting a lower weft shot in the reverse direction, inserting a pile wire therewith, and beating said latter shot and wire into the fell, and controlling said sheds for the formation of fabric ground pile areas including the steps of floating the pile warps from one frame of each pair over alternate tying-in weft shots but under the associated pile wires, and floating the pile warps from the other frame of each pair over intermediate tying-in weft shots but under the associated pile wires, further controlling said sheds for the formation of a loop area which comprises the steps of floating the pile warps from one frame of each pair over a selected pile wire, over an adjacent upper weft shot at one side of said wire, and under the next adjacent wire as floats, passing the pile warps from the other frame of each pair over said pile wire, over the adjacent upper weft shot at the other side of said wire and under the next adjacent wire as floats, and tying-in each of said pile warps under the adjacent upper weft shot at each side of the float.

43. In the manufacture of a two-shot jacquard weave carpet having chain warps, stuffer warps, pile warps strung in at least two frames, and with each warp of one frame paired with a warp of a second frame between chain warps in a dent of the reed, and upper and lower weft slots inserted through the fabric alternately and in opposite directions, the method of weaving said carpet which comprises for each weaving cycle forming a shed, inserting an upper weft shot, and beating the shot into the fell, forming a second shed, inserting a lower weft shot in the reverse direction, inserting alternately a pile wire and a cutting wire therewith, and heating said latter shot and wire into the fell, and controlling said sheds for the formation of selected ground pile, loop pile, and cut pile areas, which comprises for each ground pile area passing the two warps of each pair in alternation over successive upper weft shots but under the associated wires as floats, for each loop pile area passing both pile warps of each pair over each successive round wire and over an adjacent upper weft shot but under the adjacent cutting wires as floats, and for each cut pile area passing the pile warps of each pair over each successive cutting wire and over an upper weft shot adjacent said wire but under the adjacent round wires, and tying-in each of said pile warps under the upper weft shot at each side of each float.

44. In the manufacture of a two-shot jacquard weave carpet having chain warps, stuffer warps, pile warps strung in at least two frames, and with each warp of one frame paired with a warp of a second frame between chain warps in a dent of the reed, and upper and lower weft shots inserted through the fabric alternately and in opposite directions, the method of weaving said carpet which comprises for each weaving cycle forming a shed, inserting an upper weft shot, and beating the shot into the fell, forming a second shed, inserting a lower weft shot in the reverse direction, inserting alternately a pile wire and a cutting wire therewith, and beating said latter shot and wire into the fell, and controlling said sheds for the formation of selected ground pile, loop pile, and cut pile areas which comprises for each ground pile area passing one pile warp of each pair over alternate upper weft shots but under the associated wires as floats, and passing the other pile warp of each pair over intervening upper weft shots but under the associated wires as floats, for each loop pile area passing both pile warps of each pair over each successive round wire and in alternation over an upper weft shot adjacent said round wire at one side and then the other thereof, and for each cut pile area passing the pile warps of each pair over each successive cutting wire and in alternation over an upper weft shot at each side of said wire, and tying-in each of said pile warps under the adjacent upper weft shot at each side of each float.

45. In the manufacture of a two-shot jacquard weave carpet having chain warps, stuffer warps, pile warps strung in at least two frames, and with each warp of one frame paired with a warp of a second frame between chain warps in a dent of the reed, and upper and lower weft shots inserted through the fabric alternately and in opposite directions, the method of weaving said carpet which comprises for each weaving cycle forming a shed, inserting an upper weft shot, and beating the shot into the fell, forming a second shed, inserting a lower weft shot in the reverse direction, inserting alternately a pile wire and a cutting wire therewith, and beating said latter shot and wire into the fell, and controlling said sheds to pass selected pile warps over both the upper and lower weft shots but under each associated pile wire to form ground pile areas, to pass selected pile warps over the upper and lower weft shots and over an associated round wire but under adjacent cutting wires at each side thereof to form loop pile areas, and to pass selected pile warps over the upper and lower weft shots and over an associated cutting wire but under the round wires at each side thereof to form cut pile areas.

46. In a two-shot jacquard weave carpet having upper and lower weft shots inserted through the fabric in opposite directions, the weft shots inserted in one direction only being tying-in weft shots, chain warps, stuffer warps, and pile warps arranged in pairs in continuously parallel relationship between chain warps, the combination in said carpet of cut pile surface areas comprising cut loops formed from one pile warp of each pair tied-in under alternate tying-in weft shots and having the cut ends thereof extending upwardly through each interstice between successively inserted tying-in weft shots, and cut loops formed from the other pile warp of each pair tied-in under intervening tying-in weft shots and having the cut ends thereof extending upwardly through each interstice between successively inserted tying-in weft shots.

47. In a two-shot jacquard weave carpet having upper and lower weft shots inserted through the fabric in opposite directions, stuffer warps, and pile warps arranged in pairs in continuously parallel relationship between chain warps, the combination in said carpet of cut pile surface areas comprising cut loops formed from one pile yarn of each pair tied-in under alternate upper weft shots and having the cut ends thereof extending upwardly through each interstice between successively inserted upper weft shots, and cut loops formed from the other pile warp of each pair tied-in under intervening upper weft shot and having the cut ends thereof extending upwardly through each interstice between successively inserted upper weft shots.

48. In a two-shot jacquard weave carpet having upper and lower weft shots inserted through the fabric in opposite directions, stuffer warps and pile warps arranged in pairs in continuously parallel relationship between chain warps, the combination in said carpet of cut pile surface areas comprising cut loops formed from one pile yarn of each pair tied-in under alternate upper weft shots and having the cut ends thereof extending upwardly through each interstice between successively inserted upper weft shots, and cut loops formed from the other pile warp of each pair tied-in under intervening upper weft shots and having the cut ends thereof extending upwardly through each interstice between successively inserted upper weft shots, one pile yarn of each pair tied-in under alternate upper weft shots and floated over the intervening upper weft shots, and loops formed from the other pile warp of each pair tied-in under the intervening upper weft shots and floated over the alternate upper weft shots.

References Cited in the file of this patent

UNITED STATES PATENTS

| Number | Name | Date |
|---|---|---|
| 760,985 | Hardwick | May 24, 1904 |
| 760,986 | Hardwick | May 24, 1904 |
| 1,999,883 | Michaelis | Apr. 30, 1935 |
| 2,163,135 | Shuttleworth | June 20, 1939 |
| 2,285,332 | Gebert | June 2, 1942 |
| 2,325,520 | Krijger | July 27, 1943 |
| 2,477,248 | Harding | July 26, 1949 |
| 2,575,029 | Shuttleworth | Nov. 13, 1951 |
| 2,590,608 | Groat | Mar. 25, 1952 |
| 2,609,839 | Groat | Sept. 9, 1952 |
| 2,649,862 | Harding | Aug. 25, 1953 |
| 2,681,083 | Dacey | June 15, 1954 |

FOREIGN PATENTS

| Number | Country | Date |
|---|---|---|
| 14,050 | Great Britain | of 1906 |
| 32,561 | Austria | Apr. 10, 1908 |